(12) United States Patent
Kimoto et al.

(10) Patent No.: US 9,421,490 B2
(45) Date of Patent: Aug. 23, 2016

(54) FUEL VAPOR PROCESSING APPARATUS

(71) Applicant: AISAN KOGYO KABUSHIKI KAISHA, Obu-shi, Aichi-ken (JP)

(72) Inventors: Junya Kimoto, Obu (JP); Yuzuru Ito, Chiryu (JP); Naoyuki Tagawa, Nagoya (JP); Yoshikazu Miyabe, Obu (JP); Minoru Akita, Ama (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 63 days.

(21) Appl. No.: 14/553,619

(22) Filed: Nov. 25, 2014

(65) Prior Publication Data

US 2015/0143996 A1    May 28, 2015

(30) Foreign Application Priority Data

Nov. 25, 2013  (JP) ................. 2013-242841
Nov. 25, 2013  (JP) ................. 2013-242847

(51) Int. Cl.
*F02M 25/08* (2006.01)
*B01D 53/04* (2006.01)

(52) U.S. Cl.
CPC ........... *B01D 53/0454* (2013.01); *F02M 25/08* (2013.01); *B01D 2259/4516* (2013.01); *F02M 2025/0845* (2013.01)

(58) Field of Classification Search
CPC .............. B01D 53/0454; B01D 2259/4516; F02M 25/08; F02M 2025/0845; F02M 2025/0854
USPC ............... 96/109, 113, 116; 95/146; 123/519
See application file for complete search history.

(56) References Cited

U.S. PATENT DOCUMENTS

| | | | |
|---|---|---|---|
| 6,012,437 A | 1/2000 | Radhamohan et al. | |
| 6,336,446 B1 * | 1/2002 | Isobe | F02M 25/0809 |
| | | | 123/198 D |
| 8,607,765 B2 | 12/2013 | Hagen | |

(Continued)

FOREIGN PATENT DOCUMENTS

| | | |
|---|---|---|
| DE | 19838959 A1 | 3/2000 |
| DE | 10 2008 041 876 A1 | 4/2009 |

(Continued)

OTHER PUBLICATIONS

German Patent Application No. DE 10 2014 017 158.2 Office Action dated Jun. 16, 2015 (7 pages).

(Continued)

*Primary Examiner* — Frank Lawrence
(74) *Attorney, Agent, or Firm* — Conley Rose, P.C.

(57) ABSTRACT

A fuel vapor processing apparatus may include a canister, a closing valve provided in a vapor passage connecting the canister and the fuel tank, an actuator coupled to the movable valve member, and a control device coupled to the actuator. The control device may perform a learning control, in which a valve opening start position is learned based on a stroke distance of the movable valve member, which is given at the time when an internal pressure of the fuel tank is reduced by a predetermined pressure value while the moving distance of the movable valve member is changed such that (a) the movable valve member moves from the reference position to a learning start position at a first speed in a valve opening direction and (b) the movable valve member moves further from the learning start position at a second speed in the valve opening direction.

21 Claims, 15 Drawing Sheets

(56) References Cited

U.S. PATENT DOCUMENTS

| | | |
|---|---|---|
| 2009/0078898 A1 | 3/2009 | Sasaki et al. |
| 2011/0062358 A1 | 3/2011 | Kawamura et al. |
| 2011/0296997 A1 | 12/2011 | Sugiura |
| 2012/0145133 A1* | 6/2012 | Takamatsu ............ F02D 41/0032 123/520 |
| 2014/0102420 A1* | 4/2014 | Kimoto ............... F02M 25/0836 123/520 |
| 2015/0159566 A1* | 6/2015 | Akita .................... F02D 41/003 137/488 |
| 2015/0159598 A1* | 6/2015 | Tagawa ............... F02M 25/0854 123/520 |
| 2015/0292447 A1* | 10/2015 | Tagawa ............... F02M 25/0809 137/198 |
| 2015/0330337 A1* | 11/2015 | Tagawa ............... F02M 25/0809 123/519 |
| 2015/0330338 A1* | 11/2015 | Ito ....................... F02M 25/0854 123/520 |

FOREIGN PATENT DOCUMENTS

| | | |
|---|---|---|
| DE | 11 2009 001 471 T5 | 4/2011 |
| DE | 10 2010 014 558 A1 | 10/2011 |
| DE | 10 2013 016 984 A1 | 4/2014 |
| JP | 05-33729 A | 2/1993 |
| JP | 08-74678 A | 3/1996 |
| JP | 10-299583 A | 11/1998 |
| JP | 10-299586 A | 11/1998 |
| JP | 2004-156496 A | 6/2004 |
| JP | 2004-308483 A | 11/2004 |
| JP | 2005-155323 A | 6/2005 |
| JP | 2010-281258 A | 12/2010 |
| JP | 2011-256778 A | 12/2011 |
| JP | 2013-104316 A | 5/2013 |
| JP | 2013-113198 A | 6/2013 |

OTHER PUBLICATIONS

German Patent Application No. DE 10 2014 017 159.0 Office Action dated Feb. 8, 2016 (8 pages).

German Patent Application No. DE 10 2014 017 159.0 Office Action dated Jun. 15, 2016 (5 pages).

* cited by examiner

FUEL VAPOR PROCESSING APPARATUS

CROSS-REFERENCE TO RELATED APPLICATIONS

This application claims priority to Japanese patent application serial number 2013-242841 filed Nov. 25, 2013 and Japanese patent application serial number 2013-242847, filed Nov. 25, 2013, the contents of both are incorporated herein by reference in their entirety for all purposes.

STATEMENT REGARDING FEDERALLY SPONSORED RESEARCH OR DEVELOPMENT

Not applicable.

BACKGROUND

Embodiments of the present disclosure relate to fuel vapor processing apparatus that may include a canister for adsorbing fuel vapor generated in a fuel tank, and a closing valve provided in a vapor passage connecting the canister and the fuel tank to each other.

JP-A-2011-256778 discloses a fuel vapor processing apparatus that may include a closing valve (control valve) provided in a vapor passage connecting a canister and a fuel tank to each other. The closing valve may include a non-sensitive range (valve closing range) for closing the valve, and a communicating range (valve opening range) for allowing flow of fuel vapor through the closing valve. When the closing valve is in the valve closing range, the fuel tank may be kept at a closed state. On the other hand, when the closing valve is in the valve opening range, fuel vapor produced in the fuel tank may be released toward the canister, so that the internal pressure of the fuel tank may be reduced.

The fuel vapor processing apparatus of the above document is configured to perform a learning control in which the degree of opening of the closing valve is changed in an opening direction from a fully closed position at a fixed speed. The degree of opening of the closing valve given at the time when the internal pressure of the fuel tank begins to be reduced may be stored as a valve open start position.

In order to learn the valve open start position of the closing valve with high accuracy, it may be necessary to change the opening degree of the closing valve in the opening direction at a relatively low speed. However, according to the learning control of the above document, the opening degree of the closing valve may be changed at the fixed speed or a constant speed. As a result, it may take a relatively long time for accurately perform the learning control.

Therefore, there has been a need in the art for enabling a learning control to be accurately performed in a relatively short time.

SUMMARY

In one aspect according to the present teachings, a fuel vapor processing apparatus may include a canister, a closing valve provided in a vapor passage connecting the canister and the fuel tank, an actuator coupled to the movable valve member, and a control device coupled to the actuator. The control device may perform a learning control, in which a valve opening start position is learned based on a stroke distance of the movable valve member, which is given at the time when an internal pressure of the fuel tank is reduced by a predetermined pressure value while the moving distance of the movable valve member is changed such that (a) the movable valve member moves from the reference position to a learning start position at a first speed in a valve opening direction and (b) the movable valve member moves further from the learning start position at a second speed in the valve opening direction. The second speed may be lower than the first speed.

DETAILED DESCRIPTION

Figure 1:
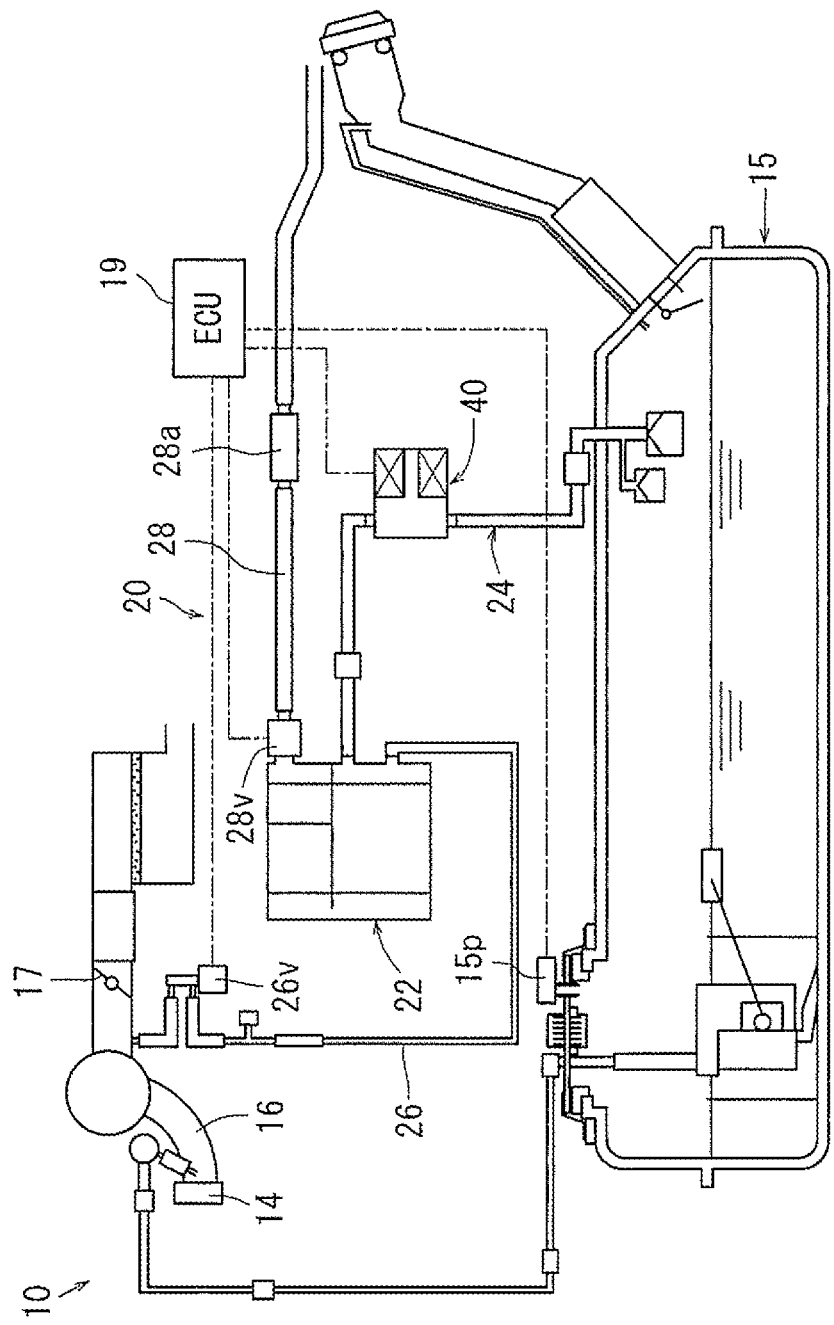
FIG. 1 is a schematic view illustrating the general construction of a fuel vapor processing apparatus according to a first embodiment.

Each of the additional features and teachings disclosed above and below may be utilized separately or in conjunction with other features and teachings to provide improved fuel vapor processing apparatus. Representative examples which utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples. Moreover, various features of the representative examples and the dependent claims may be combined in ways that are not specifically enumerated in order to provide additional useful examples of the present teachings.

In one embodiment, a fuel vapor processing apparatus may include a canister, a closing valve and a control device. The canister may adsorb fuel vapor produced in a fuel tank. The closing valve may be provided in a vapor passage connecting the canister and the fuel tank. The closing valve may include a movable valve member and an actuator coupled to the movable valve member. The closing valve may be closed when a stroke distance of the movable valve member with respect to a reference position is between zero and a valve open start position. The closing valve may be opened when the stroke distance of the movable member exceeds the valve open start position. The control device may be coupled to the actuator and configured to perform a learning control, in which the valve opening start position is learned based on the stroke distance of the movable valve member, which is given at the time when an internal pressure of the fuel tank is reduced by a predetermined pressure value from a reference pressure value while the moving distance of the movable valve member is changed such that (a) the movable valve member moves from the reference position to a learning start position at a first speed in a valve opening direction and (b) the movable valve member moves further from the learning start position in the valve opening direction at a second speed that may be lower than the first speed.

In this way, the learning control for learning the valve opening start position may be performed by changing the stroke distance of the valve movable member such that the movable valve member moves at the second speed lower than the first speed after passing the learning start position.

In other words, the valve movable member may move at a higher speed until reaching to the learning start position and may move at a lower speed for learning the valve opening start position. Therefore, it may be possible to accurately learn the valve opening start position in a relatively short time.

The closing valve may further include a valve seat, and the movable valve member may move relative to the valve seat in an axial direction.

The learning start position may be a valve closing limit position determined according to a design of the closing valve. Alternatively, the leaning start position may be away from a pressure reducing position by a distance in a valve closing direction opposite to the valve opening direction. The pressure reducing position may be a position where the internal pressure of the fuel tank is reduced by the predetermined pressure value during the movement of the movable valve member at the first speed.

The stroke distance of the movable valve member may be changed at the second speed by repeating a learning step. The learning step may include a first step part in which the stroke distance is shifted in the valve opening direction by a first distance, and a second step part in which the stroke distance is shifted in a valve closing direction opposite to the valve opening direction by a second distance smaller than the first distance.

In this way, the learning step may be repeatedly performed by moving the movable valve member alternately in the valve opening direction and in the valve closing direction for changing the stroke distance at the second speed that may be an average speed in this case.

The internal pressure of the fuel tank may be detected during the second step part of the learning step. The control device may determine the valve opening start position based on a stroke distance value that is given when the tank internal pressure is reduced by the predetermined pressure value during the second step part of any of the repeated learning steps. Alternatively, the control device may determine the valve opening start position based on a stroke distance value that is given during the second step part of the leaning step performed prior to any of the repeated learning steps, where the tank internal pressure is reduced by the predetermined pressure value during the second step part.

In this way, the control device may determine the valve opening start position during the time when the stroke distance is changed by the second distance, i.e., when the valve movable member is returned to reduce the degree of opening. Therefore, the responsiveness to the change in the tank internal pressure can be improved. Hence, it may be possible to minimize a potential difference between the time of determination of the valve start opening position and the time when the closing valve actually begins to be opened. Therefore, the learning accuracy can be improved also in this respect.

The canister may be connected to a vehicle engine via a purge passage, and the control device may be configured to perform the learning control at each time the vehicle engine is started. In other words, the control device may perform the learning control at each time an ignition switch of the vehicle engine is turned on. In this way, even in the case that the learning value obtained at the previous learning step was not correct, it may be possible to minimize the adverse affect that may be caused by the incorrect learning value. It may be also possible to minimize the influence of shifting of the learning value, which may be caused when some of parts of the closing valve are replaced with new ones.

In another embodiment, a fuel vapor processing apparatus may include a canister, a closing valve, an actuator and a control device. The canister may adsorb fuel vapor produced in a fuel tank. The closing valve may be provided in a vapor passage connecting the canister and the fuel tank. The closing valve may include a movable valve member. The actuator may be coupled to the movable valve member. The closing valve may be closed when a stroke distance of the movable valve member with respect to a reference position is between zero and a valve open start position, and the closing valve is opened when the stroke distance of the movable member exceeds the valve open start position. The control device may perform a learning control, in which the valve opening start position is learned based on the stroke distance of the movable valve member, which is given at the time when an internal pressure of the fuel tank is reduced by a predetermined pressure value while the movable valve member moves from a learning start position in the valve opening direction. The learning start position may be a position where the stroke distance of the movable valve member is smaller than a reference learning value by a predetermined control value.

In order to perform the learning control, the movable member may first move to the learning start position where the stroke distance of the movable valve member is smaller than the reference learning value. After that, the movable valve member may move further from the learning start position for learning the valve opening start position. Therefore, after passing the learning start position, the movable valve member may be moved at a lower speed than a speed before reaching the learning start position. In this way, it may be possible to accurately learn the valve opening start position in a relatively short time.

The control device may be configured to repeatedly perform the learning control, and the reference learning value may be that obtained by the learning control previously performed.

The control device may be further configured to perform a learning prohibition control in which the learning control for learning the valve opening start position is prohibited if a fuel tank condition is unstable.

For example, the fuel tank condition may be determined to be unstable if a degree of fluctuation of a fuel liquid level within the fuel tank is larger than a predetermined fluctuation value.

In the case that the fuel vapor processing apparatus is used for a vehicle, the fluctuation of the liquid level may become larger than that during normal traveling of the vehicle, for example, due to sudden acceleration or reduction of the vehicle speed (which may be determined based on the degree of opening of the throttle valve, a signal from an acceleration sensor or a stepping force of a vehicle brake, etc.), a large turning angle of the vehicle (which may be determined based on a steering angle), rough road traveling (which may be determined based on the internal pressure of a shock absorber), descending or ascending road traveling (which may be determined based on inclination of the vehicle), or a gust of wind (which may be determined based on a highlighted indication in a navigation display).

If the fluctuation of the liquid level within the fuel tank becomes larger than that during normal traveling of the vehicle, it is likely that fuel vapor is produced within the fuel tank to cause an increase in the internal pressure of the fuel tank. Therefore, it may be possible that the internal pressure of the fuel tank is not reduced by the predetermined pressure value in the case that the closing valve is opened for learning the valve opening start position. For this reason, it may be advantageous to prohibit the learning control if the fluctuation of the liquid level within the fuel tank becomes larger than that during normal traveling of the vehicle. In this way, it may be possible to prohibit incorrect learning of the valve opening start position.

Additionally or alternatively, the fuel tank condition may be determined to be unstable if a change of the internal pressure of the fuel tank during a predetermined period of time is larger than a predetermined reference value. Thus, if the change of the internal pressure of the fuel tank during the predetermined period of time is larger than the predetermined reference value, it may be possible that the internal pressure of the fuel tank may not be reduced by the predetermined pressure value during opening of the closing valve for learning the valve opening start position. Therefore, by prohibiting the learning control if the change of the internal pressure of the fuel tank during the predetermined period of time is larger than the predetermined reference value, it may be possible to prohibit incorrect learning of the valve opening start position.

The learning control of the valve opening start position may be permitted if the change of the internal pressure of the fuel tank during the predetermined period of time becomes equal to or smaller than the predetermined reference value after the fuel tank condition has been determined to be unstable.

The internal pressure of the fuel tank may be detected at predetermined time intervals to obtain a pressure difference between a detected pressure and a predetermined reference value. If the pressure difference is larger than a predetermined limit value throughout a first predetermined period of time, the fuel tank condition may be determined to be unstable. If the pressure difference is not larger than the predetermined limit value throughout a second predetermined period of time, the fuel tank condition may be determined to be stable.

In another example, the fuel tank condition may be determined to be stable if a vehicle engine is stopped. The canister may be connected to the vehicle engine via a purge passage. This may be also applied to a hybrid electric vehicle that may include an engine and an electric motor. Thus, if the engine is stopped while the electric motor is driven during traveling of the vehicle, it may be determined that the fuel tank condition is stable.

The control device may be further configured to determine whether or not the learning value is correct. If it is determined that the learning value is incorrect, the control device may reset the learning value of the valve opening start position and the learning control may be performed by moving the movable valve member from the reference position. In this way, it may be possible to prohibit the closing valve from being operated based on the incorrect learning value. For example, the control device may determine whether or not the learning value is correct based on the internal pressure of the fuel tank during opening of the closing valve. Additionally or alternatively, the control device may determine whether or not the learning value is correct based on an air-fuel ratio of the vehicle engine during opening of the closing valve.

The learning control may be performed at each occasion that the closing valve is opened by a predetermined number of times. At each time the learning control is performed, the leaning value obtained by the previous learning control may be reset, so that the movable valve member moves from the reference position for performing the learning control. In this way, the learning control may be periodically performed to enable the closing valve to be always operated in a proper condition.

The closing valve may further include a valve seat, so that the movable valve member can move relative to the valve seat in an axial direction. The actuator may be a rotary drive device such as a stepping motor. A thread mechanism may be provide between the movable valve member and the rotary drive device, so that the movable valve member moves relative to the valve seat in the axial direction as the rotary drive device rotates. With this arrangement, the stroke distance of the movable valve member can be accurately controlled.

Embodiments will now be described with reference to the drawings.

First Embodiment

A fuel vapor processing apparatus 20 according to a first embodiment will now be described with reference to FIGS. 1 through 9. As shown in FIG. 1, the fuel vapor processing apparatus 20 may be provided in a vehicle engine system 10. The fuel vapor processing apparatus 20 may be configured to prevent leakage to the exterior of fuel vapor generated in a fuel tank 15 of the vehicle.

As shown in FIG. 1, the fuel vapor processing apparatus 20 may generally include a canister 22, a vapor passage 24 connected to the canister 22, a purge passage 26, and an atmospheric passage 28.

The canister 22 may be filled with activated carbon (not shown) serving as an adsorbent that can adsorb fuel vapor produced in the fuel tank 15.

One end portion (upstream side end portion) of the vapor passage 24 may communicate with a gaseous space inside the fuel tank 15, and the other end portion (downstream side end portion) of the vapor passage 24 may communicate with the interior of the canister 22. At a point along the vapor passage 24, there may be provided a closing valve 40 capable of allowing and prohibiting communication through the vapor passage 24. As will be explained later, the closing valve 40 may be configured as a flow control valve capable of adjusting a flow rate of gas flowing through the closing valve 40.

One end portion (upstream side end portion) of the purge passage 26 may communicate with the interior of the canister 22, and the other end portion (downstream side end portion) of the purge passage 26 may communicate with an intake passage 16 at a position on the downstream side of a throttle valve 17. At a point along the purge passage 26, there may be provided a purge valve 26v capable of allowing and prohibiting communication through the purge passage 26.

Further, the canister 22 may communicate with the atmospheric passage 28 via an OBD (On-board diagnostics) component 28v for failure detection. At a point along the atmospheric passage 28, there may be provided an air filter 28a. The other end portion of the atmospheric passage 28 may be opened to the atmosphere.

The closing valve 40, the purge valve 26v, and the OBD component 28v may be controlled according to control signals outputted from an ECU (engine control unit) 19.

The ECU 19 may receive inputs such as a signal from a tank internal pressure sensor 15p for detecting the internal pressure of the fuel tank 15.

Next, the basic operation of the fuel vapor processing apparatus 20 will be described. While the vehicle engine is off, the closing valve 40 may be kept in the closed state. Thus, no fuel vapor in the fuel tank 15 flows into the canister 22. When an ignition switch of the vehicle is turned on while the vehicle is stationary (e.g., parked), a learning control may be performed in order to learn a valve opening start position for the closing valve 40. Further, while the vehicle is parked, the purge valve 26v may be kept in the closed state, so that the purge passage 26 may be in the closed state, with the atmospheric passage 28 being kept in the communication state.

While the vehicle is traveling, if a predetermined purge condition is satisfied, a control operation may be performed in which the fuel vapor adsorbed by the canister 22 is purged under the control of the ECU 19. In this control operation, the purge valve 26v may be controlled to open or close while allowing the canister 22 to communicate with the atmosphere via the atmospheric passage 28. When the purge valve 26v is opened, the intake negative pressure of the engine 14 may be applied to the interior of the canister 22 via the purge passage 26. As a result, the atmospheric air may flow into the canister 22 via the atmospheric passage 28. Further, when the purge valve 26v is opened, the closing valve 40 may operate in the valve opening direction to perform a depressurization control for the fuel tank 15. Therefore, the gas (air containing fuel vapor) in the fuel tank 15 may flow into the canister 22 via the vapor passage 24. As a result, the adsorbent in the canister 22 may be purged by the air, etc. flowing into the canister 22. The fuel vapor desorbed from the adsorbent may be introduced into the intake passage 16 of the engine 14 together with the air and may be then burnt in the engine 14.

Figure 2:
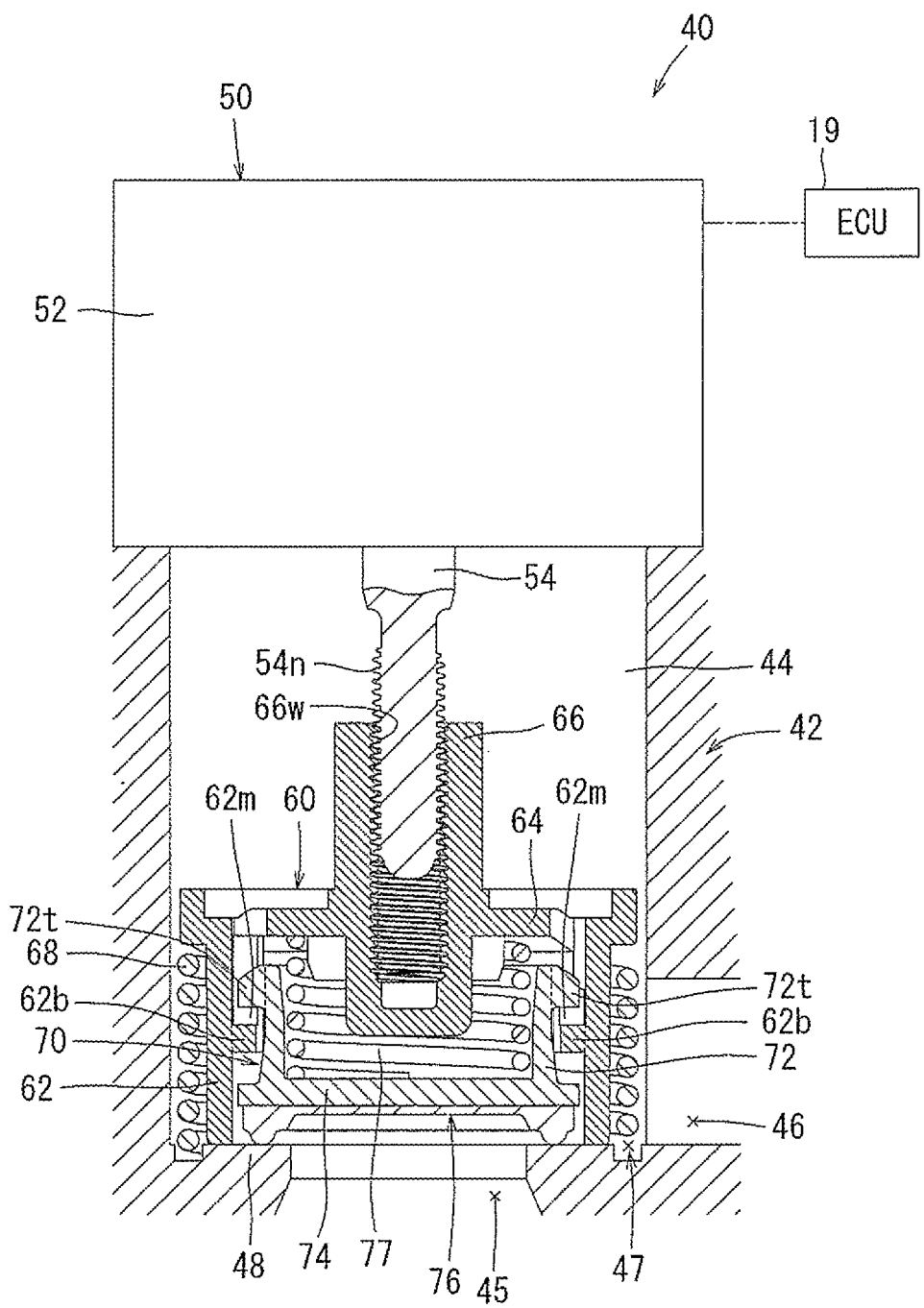
FIG. 2 is a vertical sectional view illustrating an initialized state of a closing valve used in the fuel vapor processing apparatus.

The closing valve 40 may be a flow control valve configured to close the vapor passage 24 in the closed state, and to adjust the flow rate of the gas flowing through the vapor passage 24 in the open state. As shown in FIG. 2, the closing valve 40 may include a valve casing 42, a stepping motor 50, a valve guide 60, and a valve body 70.

In the valve casing 42, there may be defined a continuous, inversed L-shaped fluid passage 47 by a valve chamber 44, an inflow passage 45, and an outflow passage 46. A valve seat 48 may be formed concentrically on the lower surface of the valve chamber 44, that is, at the open edge portion of the upper end opening of the inflow passage 45.

The stepping motor 50 may be mounted to the upper portion of the valve casing 42. The stepping motor 50 may have a motor main body 52 and an output shaft 54. The output shaft 54 may protrude from the lower surface of the motor main body 52 and may be rotatable in a normal direction and a reverse direction. The output shaft 54 may be concentrically arranged within the valve chamber 44 of the valve casing 42. A male thread portion 54n may be formed on the outer circumferential surface of the output shaft 54.

The valve guide 60 may be formed as a cylindrical tube with a closed top. The valve guide 60 may include a cylindrical tubular wall portion 62 and an upper wall portion 64 closing the upper end opening of the tubular wall portion 62. At the central portion of the upper wall portion 64, there may be concentrically formed a tubular shaft portion 66. A female thread portion 66w may be formed on the inner circumferential surface of the tubular shaft portion 66. The valve guide 60 may be arranged so as to be movable in the axial direction (vertical direction) while prohibited from rotating about the axis by a suitable rotation preventing device (not shown).

The male thread portion 54n of the output shaft 54 of the stepping motor 50 may be engaged with the female thread portion 66w of the tubular shaft portion 66 of the valve guide 60. Therefore, as the output shaft 54 of the stepping motor 54 rotates in the normal direction, the valve guide 60 may be raised in the vertical direction (axial direction). On the other hand, as the output shaft 54 of the stepping motor 50 rotates in the reverse direction, the valve guide 60 may be lowered in the vertical direction (axial direction).

Around the valve guide 60, there may be provided an auxiliary spring 68 for urging the valve guide 60 upwardly.

The valve body 70 may be formed as a cylindrical tube with a closed bottom. The valve body 70 may include a cylindrical tubular wall portion 72 and a lower wall portion 74 closing the lower end opening of the tubular wall portion 72. A seal member 76 may be a disc-like member formed of an elastic material such as a rubber. The seal member 76 may be attached to the lower surface of the lower wall portion 74.

The valve body 70 may be concentrically arranged within the valve guide 60. The seal member 76 of the valve body 70 may be arranged so as to be capable of contacting the upper surface of the valve seat 48 of the valve casing 42. A plurality of connection protrusions 72t may be formed in the circumferential direction on the outer circumferential surface of the upper end portion of the tubular wall portion 72 of the valve body 70. The plurality of connection protrusions 72t of the valve body 70 may be fitted with a plurality of vertical-groove-like connection recesses 62m formed in the inner circumferential surface of the tubular wall portion 62 of the valve guide 60 in such a manner that the valve body 70 can move relative to the valve guide 60 by a given distance in the vertical direction. The valve guide 60 and the valve body 70 can move together upwards (in the valve opening direction), with bottom wall portions 62b of the connection recesses 62m of the valve guide 60 contacting the connection protrusions 72t from below.

Further, a valve spring 77 may normally urge the valve body 70 downwards, i.e., in the valve closing direction, with respect to the valve guide 60. The valve spring 77 may be concentrically arranged between the upper wall portion 64 of the valve guide 60 and the lower wall portion 74 of the valve body 70.

Next, the basic operation of the closing valve 40 will be described. The stepping motor 50 of the closing valve 40 may rotate in the valve opening direction or in the valve closing direction by a predetermined number of steps according to an output signal (described below) from the ECU 19. As a result of rotation of the stepping motor 50 by the predetermined steps, the valve guide 60 may move by a predetermined stroke distance in the vertical direction through threaded engagement between the male thread portion 54*n* of the output shaft 54 of the stepping motor 50 and the female thread portion 66*w* of the tubular shaft portion 66 of the valve guide 60. In this way, the valve guide 60 may move in the vertical direction along a linear path.

The closing valve 40 may be set, for example, such that, at the fully opened position, the number of steps is approximately 200 and the stroke distance is approximately 5 mm.

As shown in FIG. 2, in the initialized state (initial state) of the closing valve 40, the valve guide 60 may be held at the lower limit position where the lower end surface of the tubular wall portion 62 of the valve guide 60 is in contact with the upper surface of the valve seat 48 of the valve casing 42. In this state, the connection protrusions 72*t* of the valve body 70 may be situated above the bottom wall portions 62*b* of the connection recesses 62*m*, and the seal member 76 of the valve body 70 may be pressed against the upper surface of the valve seat 48 of the valve casing 42 by the resilient force of the valve spring 77. In this way, the closing valve 40 may be kept in the fully closed state. The number of steps of the stepping motor 50 in this state may be 0 (Zero), and the moving distance in the axial direction (upward direction) of the valve guide 60, i.e., the stroke distance in the valve opening direction, may be 0 mm.

While the vehicle is, for example, stationary (e.g., parked), the stepping motor 50 of the closing valve 40 may be in a state that it has rotated, for example, by four steps in the valve opening direction from the initialized state. As a result, the valve guide 60 has moved approximately 0.1 mm upwards through the threaded engagement between the male thread portion 54*n* of the output shaft 54 of the stepping motor 50 and the female thread portion 66*w* of the tubular shaft portion 66 of the valve guide 60. Therefore, the valve guide 60 may be raised from the valve seat 48 of the valve casing 42. As a result, it is unlikely that an excessive force is applied between the valve guide 60 of the closing valve 40 and the valve seat 48 of the valve casing 42 even in the case that an environment factor such as temperature is changed.

In this state, the seal member 76 of the valve body 70 may be pressed against the upper surface of the valve seat 48 of the valve casing 42 due to the resilient force of the valve spring 77.

Figure 3:
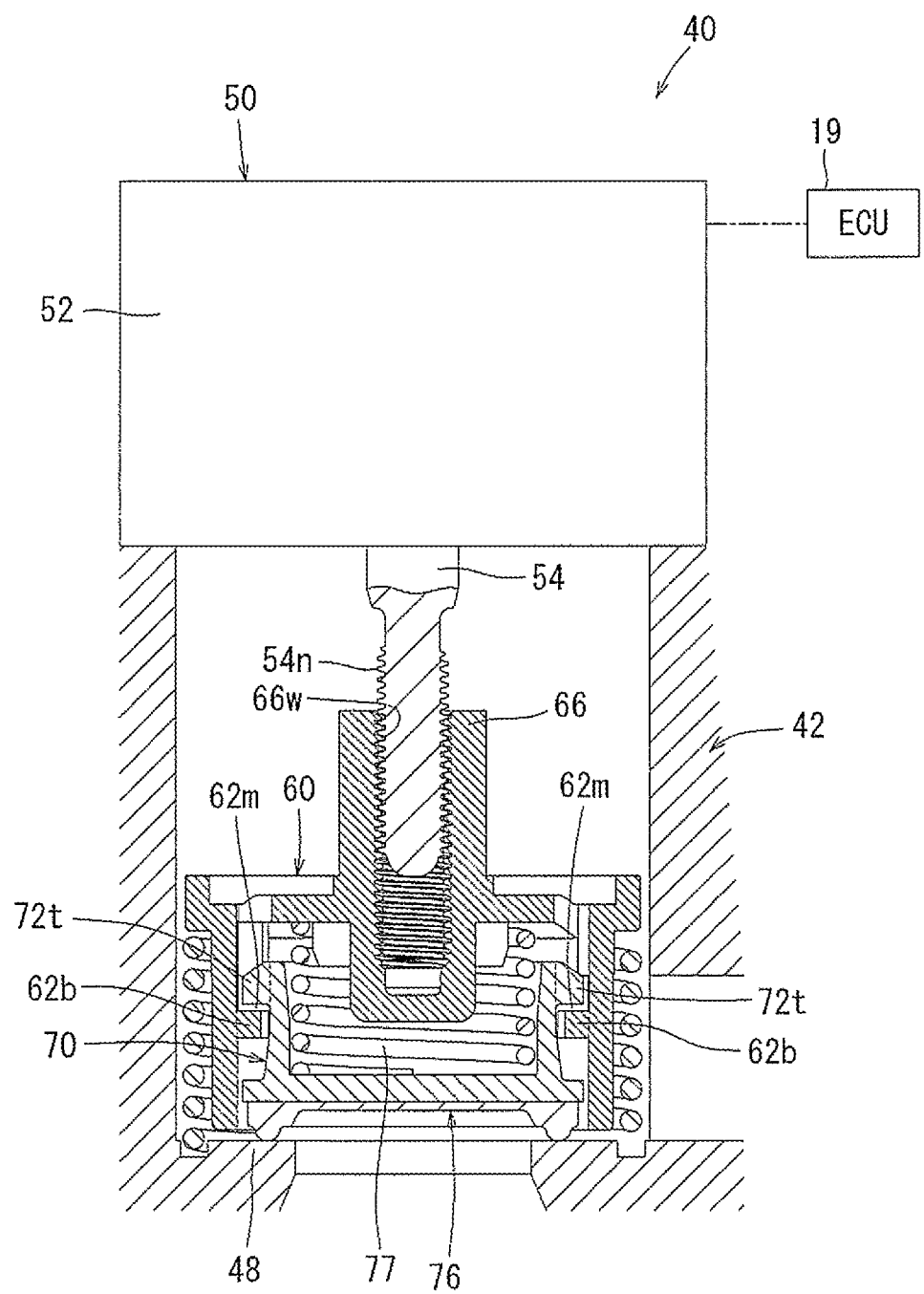
FIG. 3 is a vertical sectional view illustrating the closed state of the closing valve.
Figure 4:
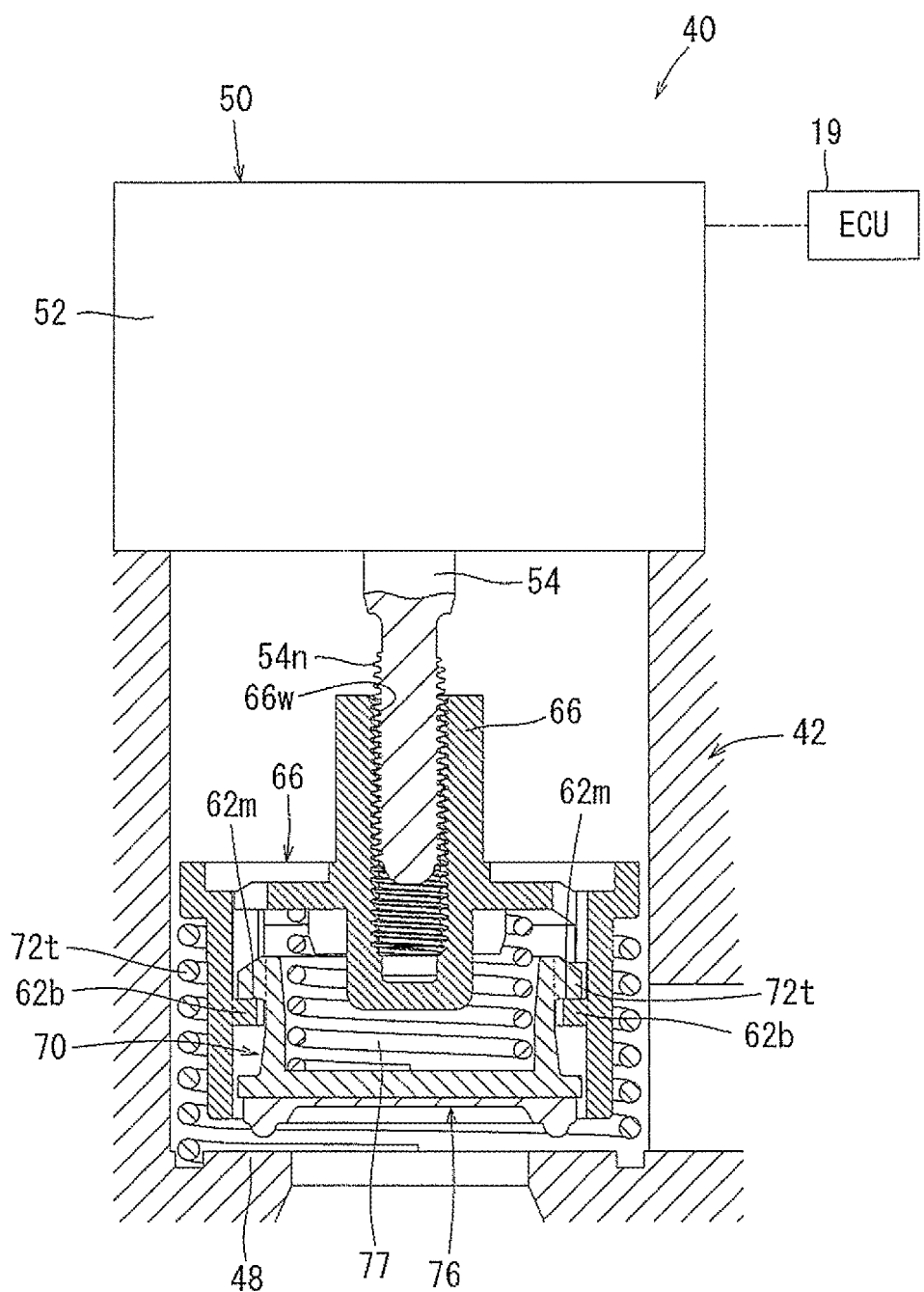
FIG. 4 is a vertical sectional view illustrating the opened state of the closing valve.

If the stepping motor 90 further rotates in the valve opening direction from the position where the stepping motor 50 has rotated by four steps, the valve guide 60 may move upwards through the threaded engagement between the male thread portion 54*n* and the female thread portion 66*w*. Therefore, as shown in FIG. 3, the bottom wall portions 62*b* of the connection recesses 62*m* of the valve guide 60 may be brought to contact the connection protrusions 72*t* of the valve body 70 from below. As the valve guide 60 moves further upwards, the valve body 70 moves upwards together with the valve guide 60 as shown in FIG. 4. Therefore, the seal member 76 of the valve body 70 may be separated from the valve seat 48 of the valve casing 42. As a result, the closing valve 40 may be opened.

The valve opening start position for the closing valve 40 may differ between different closing valves 40 due to the positional tolerance of the connection protrusions 72*t* formed on the valve body 70 and/or due to the positional tolerance of the bottom wall portions 62*b* formed on the connection recesses 62*m* of the valve guide 60, etc. Therefore, it may be necessary to correctly determine valve opening start positions for different closing valves 40. This may be achieved through a learning control in which the number of steps for the valve opening start position may be detected based on the timing when the inner pressure of the fuel tank 15 is reduced by a predetermined value while the stepping motor 50 of the closing valve 40 is rotated in the valve opening direction (while the number of steps is increased).

In this way, when the closing valve 40 is in the closed state, the valve guide 60 may serve as a movable valve portion, and, when the closing valve 40 is in the open state, the valve guide 60 and the valve body 70 may jointly serve as a movable valve portion.

Figure 5:
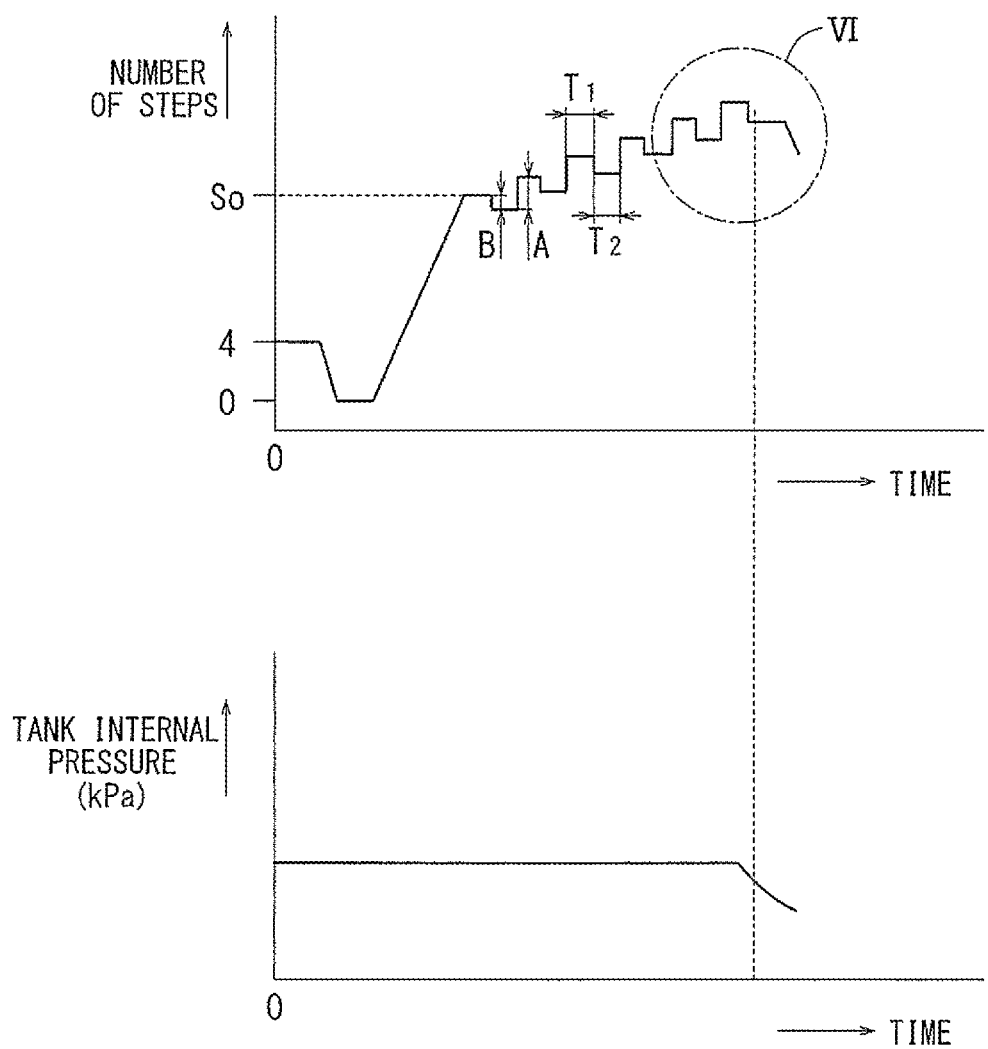
FIG. 5 is a graph illustrating a leaning control performed by a control device (ECU) of the fuel vapor processing apparatus for learning a valve opening start position of the closing valve.

Next, the learning control for the valve opening start position of the closing valve 40 will now be described with reference to FIGS. 5 and 6. The learning control may be started at the time when the ignition switch of the engine 14 is turned on. The upper part of FIG. 5 is a graph showing the change of the number of steps of the stepping motor 50, i.e., the stroke distance (axial moving distance) of the valve guide 60 and the valve body 70, with reference to the time (horizontal axis). Therefore, in this specification, the number of steps and the stroke distance may be the same in their meaning. The lower portion of FIG. 5 is a graph showing the change in the internal pressure (tank internal pressure) of the fuel tank 15 with reference to the time (horizontal axis). The tank internal pressure may be periodically detected.

As described above, when the engine of the vehicle is off, the closing valve 40 may be kept in the state that the valve guide 60 is raised approximately 0.1 mm from the valve seat 48 of the valve casing 42 as a result of rotation, for example, by 4 steps, of the stepping motor 50. If the engine ignition switch is turned on in this state, the stepping motor 50 may be rotated, for example by four steps (−4 steps) in the valve closing direction, to return the closing valve 40 to the initialized position (0 step). Next, as shown in the upper portion of FIG. 5, the stepping motor 50 may rotate at a high speed in the valve opening direction to reach a learning start position. In this embodiment, the learning start position is set to a valve closing limit position (So steps) that may be determined according to the design of the closing valve 40. In this way, the valve guide 60 may rapidly move upwards to reach the learning start position. Therefore, it may be possible to reduce the time that is necessary for the learning control. During these operations, the seal member 76 of the valve body 70 may be kept in contact with the upper surface of the valve seat 48 of the valve casing 42 to close the closing valve 40.

The stepping motor 50 may be stopped after rotation in the valve closing direction of the closing valve 40 to reach the valve closing limit position (So steps) and may be kept at this position by a predetermined period T1 (see the upper portion of FIG. 5). Then, the stepping motor 50 may be rotated by B steps, for example, by two steps, in the valve closing direction and may be kept at the rotated position by a predetermined period T2. As shown in the upper portion of FIG. 6, the tank internal pressure may be detected at a predetermined time, for example, when a predetermined period T22 has elapsed after stopping the stepping motor 50, during the predetermined period T2. If the detected tank internal pressure is not reduced by a value more than a predetermined valve ΔP from that detected at the last time, a value reduced by B steps (e.g. two steps) from the valve closing limit position (So steps) may be stored as a stroke distance of a first learning step. Thus, (So−B) steps may be stored as a stroke distance of the first learning step.

Figure 6:
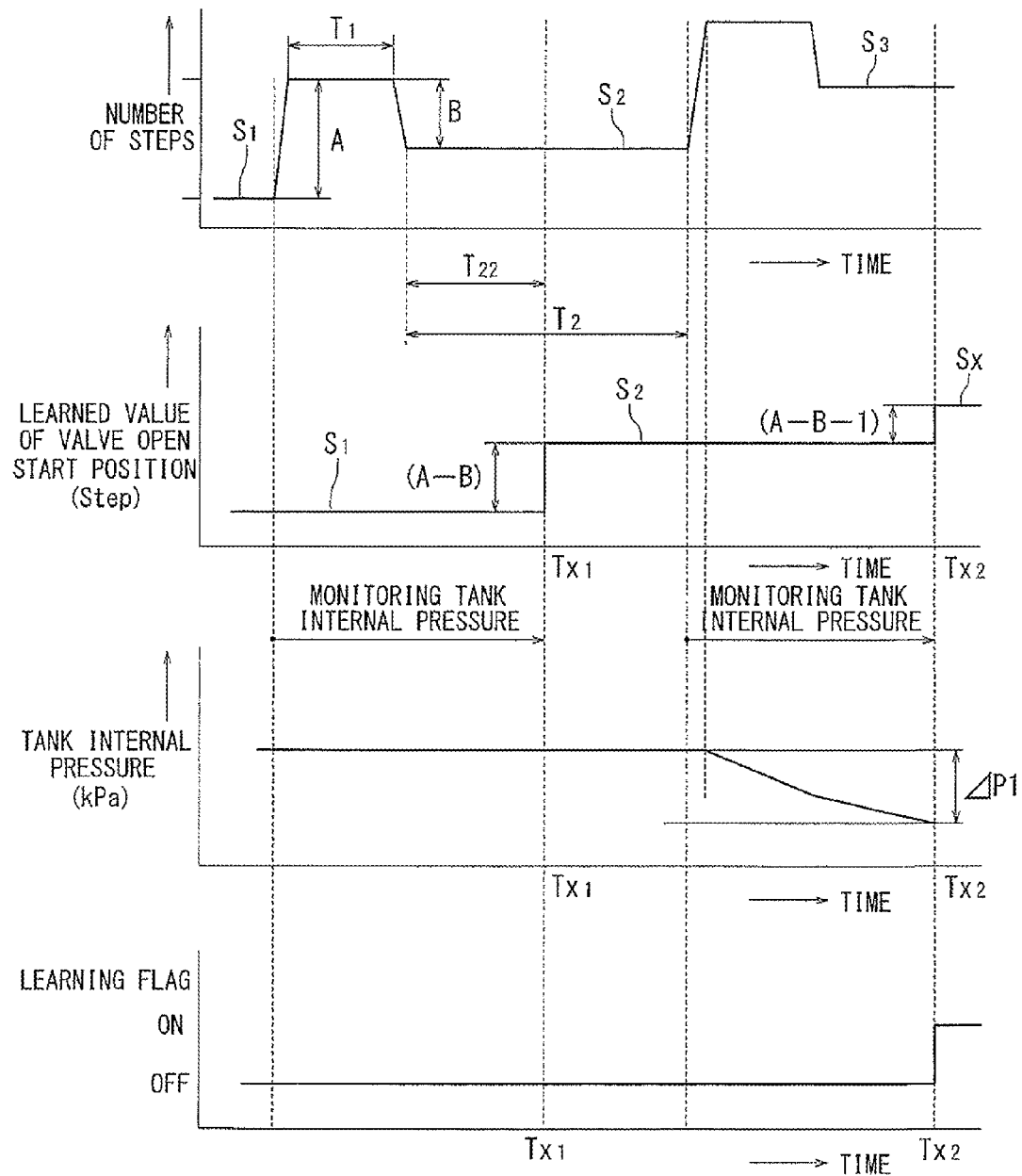
FIG. 6 is a graph illustrating the details of the control of a part indicated by arrow VI in FIG. 5.

After the predetermined period T2, the stepping motor 50 may be rotated by A steps (e.g., four steps) and may be kept at the rotated position during the predetermined period T1 as shown in the upper portions of FIGS. 5 and 6. After that, the stepping motor 50 may be rotated by B steps, for example two steps, in the valve closing direction and may be kept at the rotated position by the predetermined period T2. The tank internal pressure may be detected at the predetermined time, for example, when the predetermined period T22 has elapsed after stopping the stepping motor 50, during the predetermined period T2. If the detected tank internal pressure is reduced by a value that is not more than a predetermined valve ΔP1 from that detected at the last learning step (i.e., the first learning step), the sum of (i) the stroke distance ((So−2) steps) of the last learning step (i.e., the first learning step) and (ii) a difference ((A−B=2) steps) between A steps in the valve opening direction and B steps in the valve closing distance, which were executed at this time (second learning step), may be stored as a stroke distance of the second learning step. In this way, (So−2+2=So) steps may be stored as a stroke distance of the second learning step. In other words, the stroke distance may be updated from (So−2) steps to So steps.

The aforementioned learning step may be repeatedly performed until the tank internal pressure detected in any of the learning steps (see time T×2 in FIG. 6) is reduced by a value more than the predetermined valve ΔP1 from that detected in the last learning step (see time T×1 in FIG. 6). Then, it may be determined that the closing valve 40 has begun to be opened. Based on this determination, a learning flag may be raised at time T×2, and a learning value Sx for the valve opening start position may be calculated and stored. The learning value Sx may be the sum of S2 steps updated at time T×1 in the last learning step and (A−B−1) steps (i.e. 1 step). In this way, (S2+A−B−1) steps may be stored as the learning value Sx. Then, the learning control may be finished.

As described above, the predetermined value ΔP1 is a value of change in the tank internal pressure used for determination of the valve opening start position of the closing valve 40. The predetermined value ΔP1 may be determined by taking into account of a characteristic variation of the pressure sensor 15p, and/or a change in the fuel level of the fuel tank 15 during traveling of the vehicle. For example, the predetermined value ΔP1 may be set to approximately 0.3 kPa.

Although the learning value Sx may be calculated to be the sum of S2 steps (updated at the time T×1 in the previous learning step) and (A−B−1) steps when the learning flag is raised as described above, it may be also possible to determine the learning value Sx in a different manner. For example, when the learning flag is raised at time T×2, the stroke distance may be updated from S2 steps to S3 steps, and the learning value Sx may be calculated by subtracting (A−B−1) steps from the updated S3 steps.

As described above, the rotation of the stepping motor 50 in the valve opening direction by A steps (e.g., four steps) may cause the movable valve member to move in the valve opening direction. The rotation of the stepping motor 50 in the valve closing direction by B steps (e.g., two steps) may cause the movable valve member to move in the valve opening direction.

According to the fuel vapor processing apparatus 20 of the first embodiment, during learning of the valve opening start position of the closing valve 40, the stroke distance of the valve guide 60 (i.e., the movable valve member) may change at a first speed as the valve guide 60 moves from the fully closed position (0 step position) to the valve closing limit position (So steps) in the valve opening direction. After passing the valve closing limit position, the stroke distance of the valve guide 60 (i.e., the movable valve member) may change at a second speed that is lower than the first speed. In this way, the learning control can be accurately performed in a relatively short period of time.

In addition, after passing the valve closing limit position (So steps), in order to move the valve guide 60 in the valve opening direction, the step of moving the valve guide 60 (i.e., the movable valve member) by A steps (e.g. four steps) in the valve opening direction and moving the valve guide 60 by B steps (e.g. two steps) in the valve closing direction may be repeatedly performed. The valve opening start position may be learned when the valve guide 60 has shifted in the valve closing direction after shifting in the valve opening direction. Therefore, the responsiveness of the learning control to the change in the internal pressure of the fuel tank 15 may be improved. Thus, it may be possible to minimize the difference between the time when the closing valve 40 is actually opened, and the time when the valve opening start position is learned, i.e. the time when the reduction in the internal pressure of the fuel tank 15 is determined. Therefore, the accuracy of the learning control can be improved also in this respect.

Further, the learning control of the valve opening start position may be performed at each time when the ignition switch of the engine 14 is turned on. Therefore, even in the case that the learning value obtained at the last learning step was not correct, it may be possible to minimize the adverse affect that may be caused by the incorrect learning value. It may be also possible to minimize the influence of shifting of the learning value, which may be caused when some of parts of the closing valve 40 are replaced with new ones.

Second to fifth embodiments will now be described with reference to FIGS. 7 to 15. These embodiments are modifications of the first embodiment and are different from the first embodiment only in the control performed by the ECU 19, i.e., the control device. Therefore, the description of the second to sixth embodiments will be focused to the differences in the control to be performed.

Second Embodiment

Figure 7:
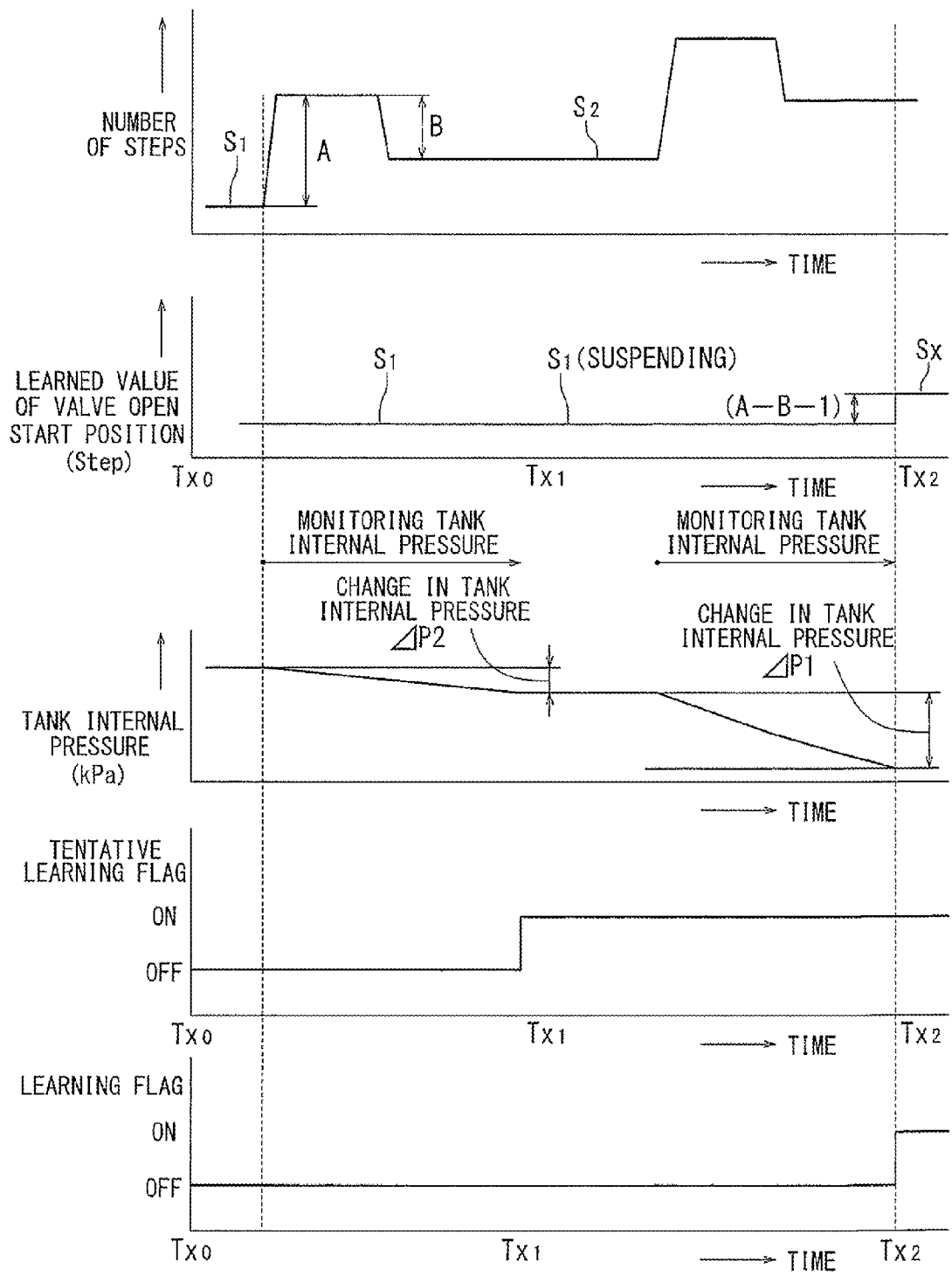
FIG. 7 is a graph similar to FIG. 6 but illustrating the details of the control performed by a control device of a fuel vapor processing apparatus according to a second embodiment.

In the first embodiment, the valve opening start position of the closing valve 40 is determined based on the reduction of the internal pressure of the fuel tank 15 by the predetermined value ΔP1. However, in some cases, in particular in the case that the tank internal pressure is relatively low, it may be possible that the tank internal pressure is not reduced by the predetermined value ΔP1 or more when the closing valve 40 begins to be opened. Therefore, according to the second embodiment, if the tank internal pressure has been reduced by a predetermined value ΔP2 (ΔP2<ΔP1) smaller than ΔP1, a tentative learning flag may be raised as shown in FIG. 7 to determine that there would be a possibility that the closing valve 40 has begun to be opened.

More specifically, after the stepping motor 50 has been rotated by the B steps (e.g., two steps) in the valve closing direction, if it is determined that the tank internal pressure detected at time T×1 has been reduced by the predetermined value ΔP2 from the tank internal pressure detected at the last time (time T×0), the tentative learning flag may be raised at time T×1. If the number of the steps of the stepping motor 50 is S2 steps as shown in the upper portion of FIG. 7 when the tentative learning flag is raised, the learning control may be prohibited from being updated after that. Thus, the stroke distance of S1 steps updated at the last learning step may be suspended. During the next learning step, if it is determined that the tank internal pressure detected at time T×2 is reduced by the predetermined value ΔP1 from the tank internal pressure detected at the last time (time T×1), the learning flag may be raised at time T×2. Then, the sum of the suspended S1 steps and (A−B−1) steps may be calculated and may be stored as the learning value Sx. Then, the learning control may be finished. In this way, it may be possible to accurately perform the learning control even in the case that the tank internal pressure is relatively low.

Third Embodiment

In the first embodiment, the operation for learning the valve opening start position of the closing valve 40 is performed by rotating the stepping motor 50 to the valve closing limit position (So steps) (i.e., the learning start position) in the valve opening direction and thereafter monitoring the tank internal pressure while the learning step is repeatedly performed. Further, in the first embodiment, the leaning step includes (i) rotating the stepping motor 50 by A steps (e.g., four steps) in the valve opening direction and (ii) rotating the stepping motor 50 by B steps (e.g., two steps) in the valve closing direction.

Figure 8:
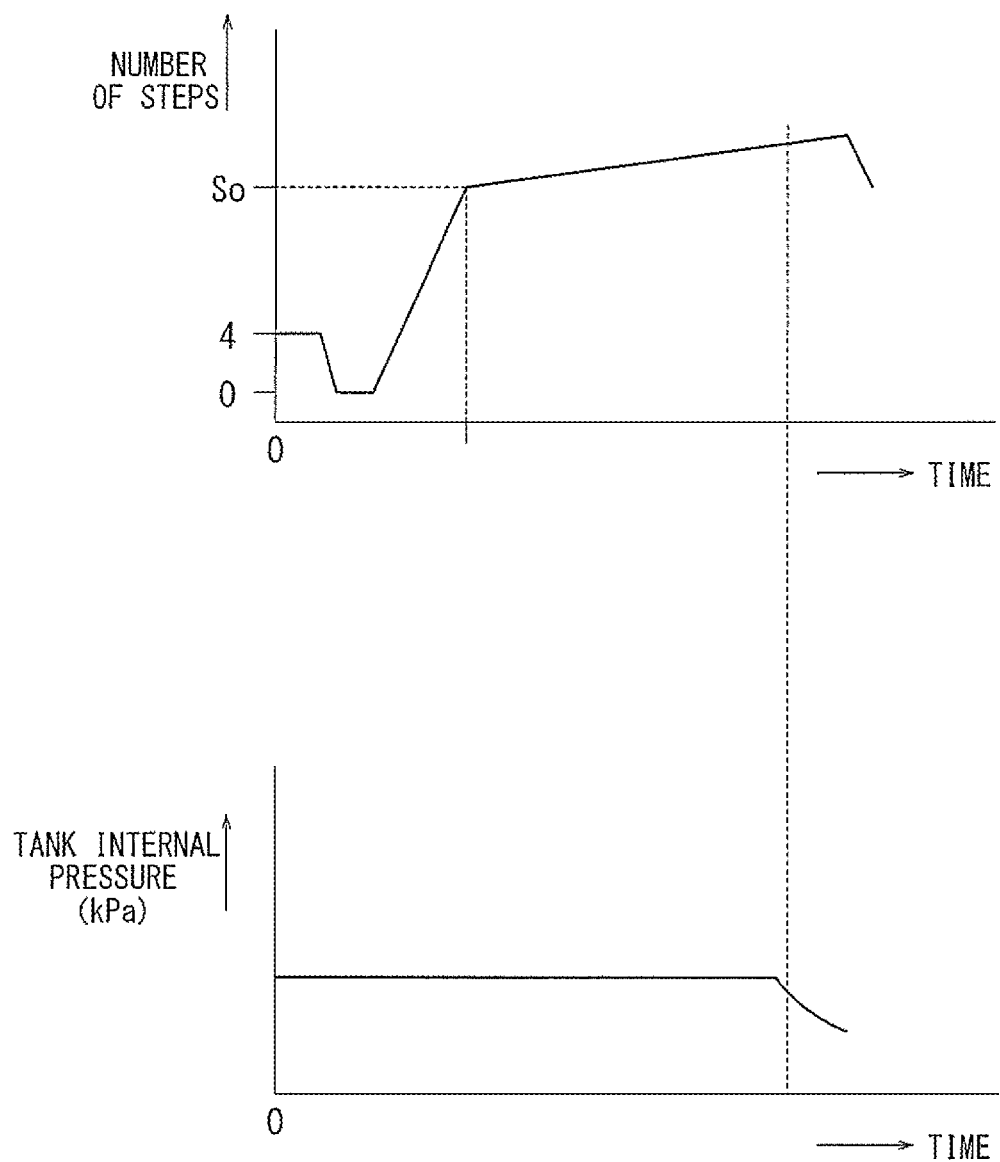
FIG. 8 is a graph illustrating a leaning control performed by a control device of a fuel vapor processing apparatus according to a third embodiment.

According to the third embodiment, similar to the first embodiment, the operation for learning the valve opening start position of the closing valve 40 may be performed by rotating the stepping motor 50 in the valve opening direction to reach the valve closing limit position (So steps) (i.e., learning start position) and thereafter monitoring the tank internal pressure while the learning step is repeatedly performed. However, in the third embodiment, the leaning step may include only rotating the stepping motor 50 by a predetermined number of steps (e.g., two steps) in the valve opening direction as shown in FIG. 8. Thus, the learning step doe not include rotating the stepping motor 50 in the valve closing direction.

Fourth Embodiment

Figure 9:
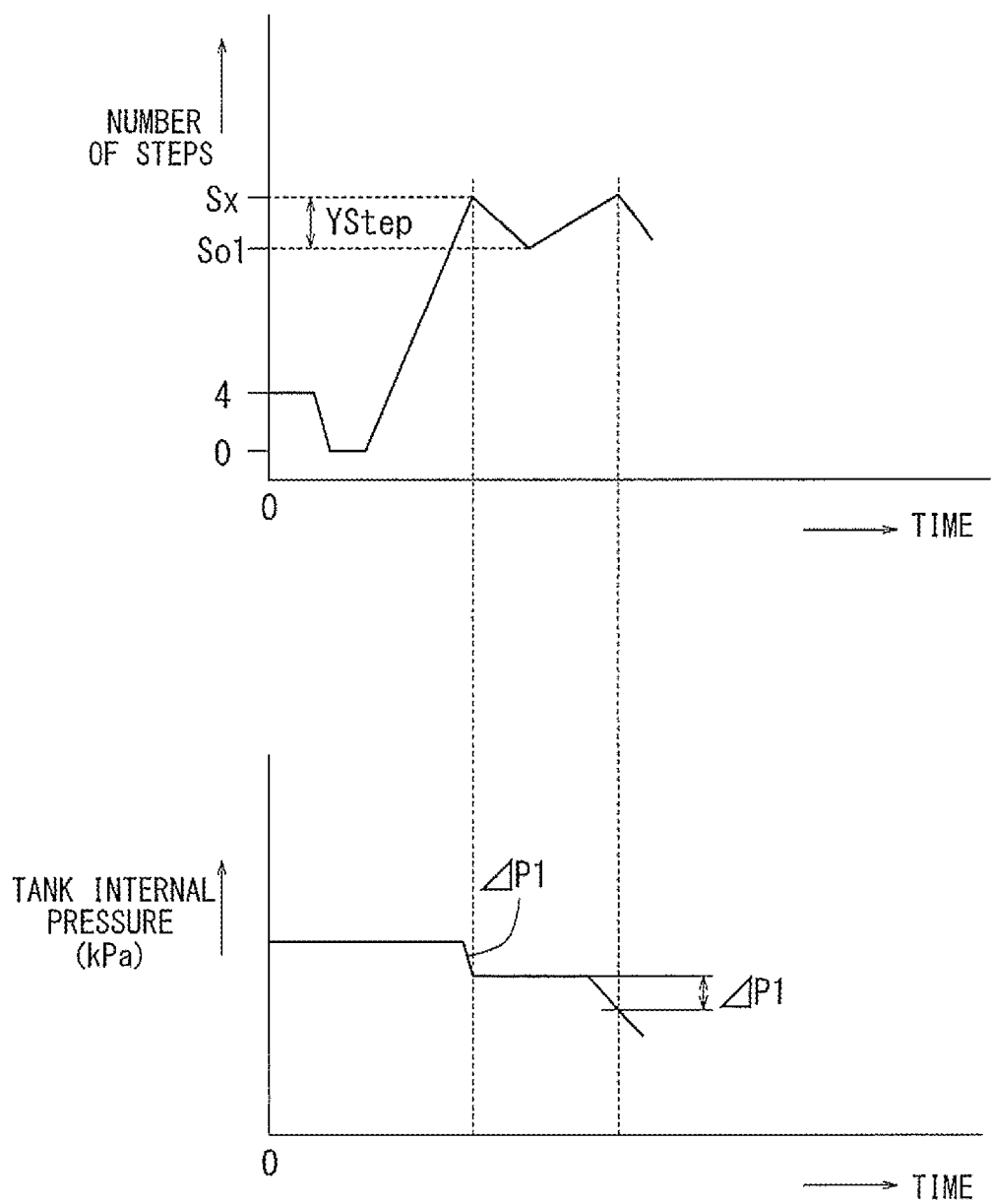
FIG. 9 is a graph illustrating a leaning control performed by a control device of a fuel vapor processing apparatus according to a fourth embodiment.

In the first embodiment, the stepping motor 50 is rotated at a high speed to reach the valve closing limit position (So steps) determined according to the design of the closing valve 40. In other words, the valve closing limit position is used as the learning start position. As shown in FIG. 9, according to the fourth embodiment, the stepping motor 50 may be rotated at a high speed until the tank internal pressure is reduced by the predetermined value $\Delta P1$. If the stroke distance is Sx steps when the tank internal pressure has been reduced by the predetermined value $\Delta P1$, So1 steps may then be calculated by subtracting Y steps from the Sx steps and may be used as the learning start position. Thus, the So1 steps (So1=Sx−Y) may be used as the learning start position in place of the valve closing limit position (So steps).

Therefore, the leaning step including (i) rotating the stepping motor 50 by the A steps (e.g., four steps) in the valve opening direction from the So1 steps and (2) thereafter rotating the stepping motor 50 by the B steps (e.g., two steps) may be repeatedly performed while the tank internal pressure is monitored.

Alternatively, the leaning step may include only rotating the stepping motor 50 by a predetermined number of steps (e.g., 2 steps) in the valve opening direction from the So1 steps and may be repeatedly performed while the tank internal pressure is monitored.

Fifth Embodiment

A fifth embodiment will now be described with reference to FIGS. 10 to 15. The fifth embodiment is basically the same as the first to fourth embodiments in that the ECU 19, i.e., the control device, performs a learning control for learning a valve opening start position of the closing valve 40. This embodiment is different from the first to fourth embodiments in that the ECU 19 may further perform a learning prohibition control in conjunction with the learning control. The other construction may be the same as the first embodiment.

The learning control for the valve opening start position of the closing valve 40 of the fifth embodiment will now be described with reference to FIGS. 10 and 11.

The learning control of this embodiment may be performed at each occasion that the closing valve 40 is opened by a predetermined number of times. In other words, the learning control may be performed during opening of the closing valve 40 by the predetermined number of times. In addition, the learning control may be performed at the time when it is determined that the condition of the fuel tank 15 is stable, such as the time when the ignition switch of the engine 14 of the vehicle is turned on.

Figure 10:
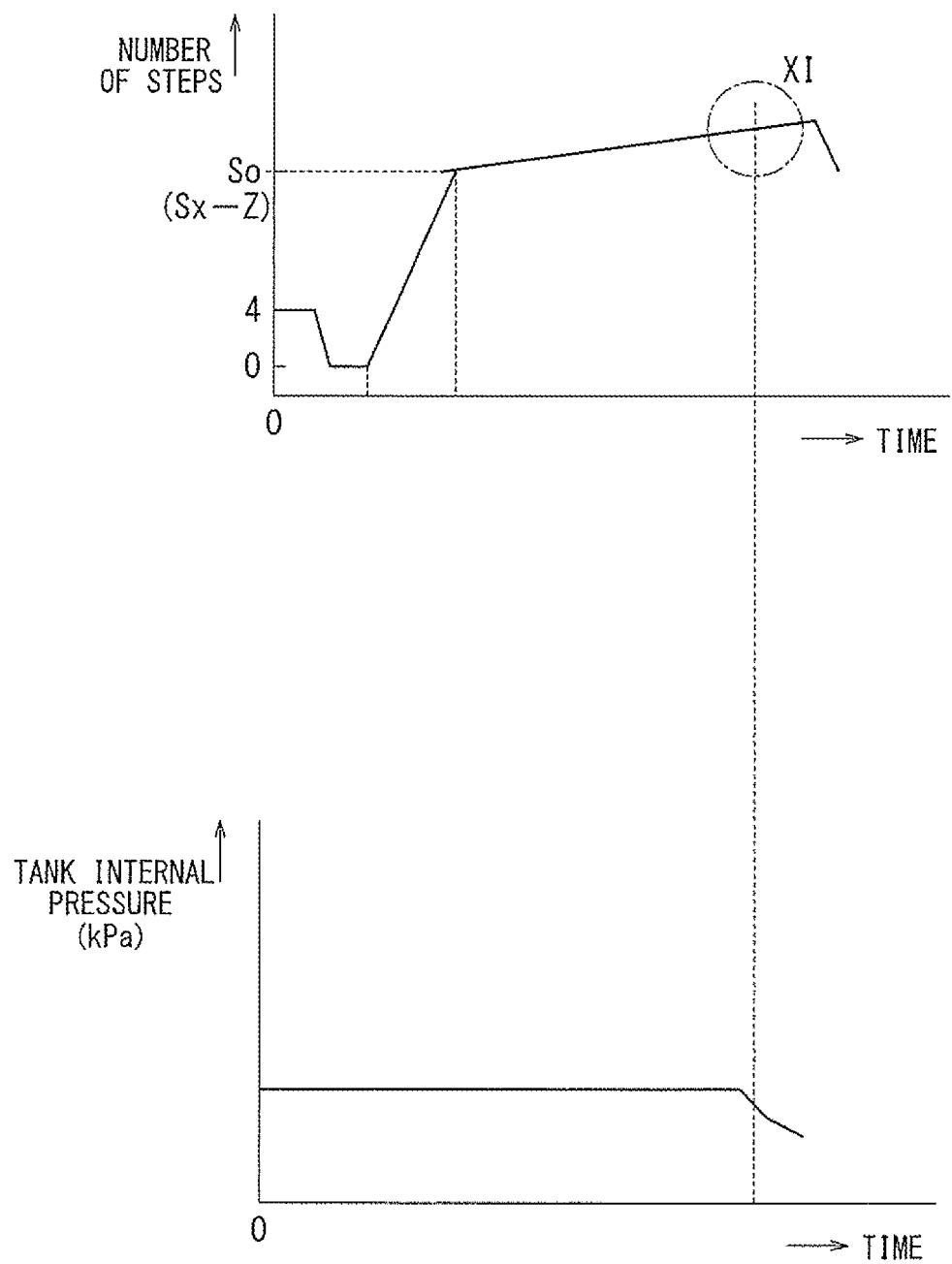
FIG. 10 is a graph illustrating a leaning control performed by a control device of a fuel vapor processing apparatus according to a fifth embodiment.

The upper portion of FIG. 10 is a graph showing the change of the number of steps of the stepping motor 50, i.e., the stroke distance (axial moving distance) of the valve guide 60 and the valve body 70, with reference to the time (horizontal axis).

The lower portion of FIG. 10 is a graph showing the change of the internal pressure (tank internal pressure) of the fuel tank 15 with reference to the time (horizontal axis). The tank internal pressure may be periodically detected.

During parking of the vehicle, the closing valve 40 may be kept in the state that the valve guide 60 is raised approximately 0.1 mm from the valve seat 48 of the valve casing 42 as a result of rotation, for example, by four steps, of the stepping motor 50. If the engine ignition switch is turned on in this state, the stepping motor 50 may be rotated, for example, by four steps (−4 steps) in the valve closing direction, to return the closing valve 40 to the initialized position (0 step). Next, as shown in the upper portion of FIG. 10, the stepping motor 50 may rotate at a high speed in the valve opening direction to reach the valve closing limit position (So steps) that may be determined according to the design of the closing valve 40. In this embodiment, the valve closing limit position (So steps) may be determined by "So=Sx−Z." Thus, the valve closing limit position (So steps) may be determined to be a position where the stepping motor 50 has returned by a predetermined number of steps (Z steps) from the learning value Sx that was obtained by the learning control performed at the last time.

In this way, similar to the above embodiments, the valve guide 60 may rapidly move upwards to reach a position corresponding to a learning start position, i.e., the valve closing limit position (So steps). Therefore, it may be possible to minimize the time necessary for the learning control. During these operations, the seal member 76 of the valve body 70 may be kept in contact with the upper surface of the valve seat 48 of the valve casing 42 to close the closing valve 40.

Figure 11:
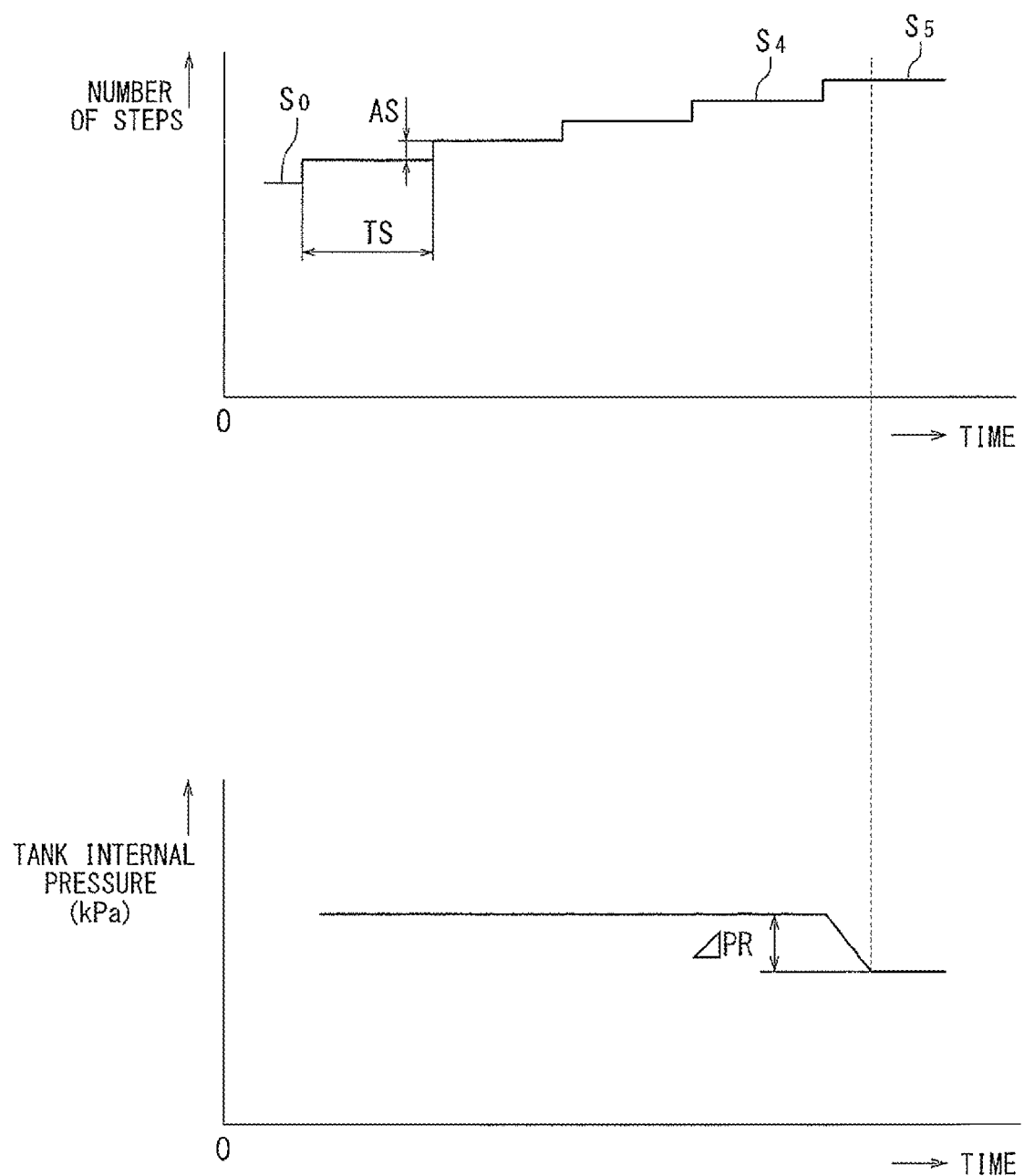
FIG. 11 is a graph illustrating the details of the control of a part indicated by arrow XI in FIG. 10.

The stepping motor 50 may be stopped after rotation in the valve opening direction to reach the valve closing limit position (So steps) and may be kept at this position by a predetermined period TS (see the upper portion of FIG. 11). The tank internal pressure may be detected at a predetermined time during the predetermined period TS. If the detected tank internal pressure is not reduced by a value more than a predetermined valve $\Delta PR$ from that detected at the last time, a value of the So steps (So=Sx−Z) may be stored as a stroke distance of a first learning step.

After the predetermined period TS, the stepping motor 50 may be rotated by AS steps, (e.g., two steps) in the valve opening direction and may be kept at the rotated position during the predetermined period TS as shown in the upper portions of FIG. 11. The tank internal pressure may then be detected during the predetermined period TS2 after stopping the stepping motor 50. If the detected tank internal pressure is not reduced by a value more than the predetermined valve ΔPR from that detected at the last learning step (i.e., the first learning step), the sum of the stroke distance (So steps) of the previous learning step (i.e., the first learning step) and the stroke distance (AS steps) executed at the current learning step (second learning step) may be stored as a stroke distance of the second learning step. In this way, a value of (So+AS) steps may be stored as the stroke distance of the second learning step. In other words, the stroke distance may be updated from So steps to (So+AS) steps.

The aforementioned learning step may be repeatedly performed until the detected tank internal pressure is reduced by a value more than the predetermined valve ΔPR from that detected in the last learning step. Then, it may be determined that the closing valve 40 has begun to be opened. Based on this determination, a learning flag may be raised, and a learning value for the valve opening start position may be calculated and stored. The learning value may be the sum of S4 steps updated in the last learning step and (AS−1) steps. Then, the learning control may be finished.

In the case of the learning control that is performed for the first time (i.e, in the case that there is no learning value (Sx) obtained at the last time), the valve closing limit position determined according to the design of the closing valve 40 described in connection with the first embodiment or the position So1 (So1=Sx−Y) described in connection with the fourth embodiment may be used as a reference learning value for the first learning control.

Next, the learning prohibition control will be described with reference to FIGS. 12 and 13.

For example, when the engine 14 is stopped immediately after the vehicle has traveled with a high load, a relatively large amount of fuel vapor may be produced within the fuel tank 15 to cause an increase in the tank internal pressure. In such a case, it may be possible that the tank internal pressure is not reduced by a value more than the predetermined value ΔPR during the learning control. In this situation, it may not be possible to correctly learn the valve opening start position.

Therefore, in this embodiment, the ECU 19 may perform the learning prohibition control for prohibiting the learning control if it is determined that the valve opening start position may not be correctly determined.

Figure 13:
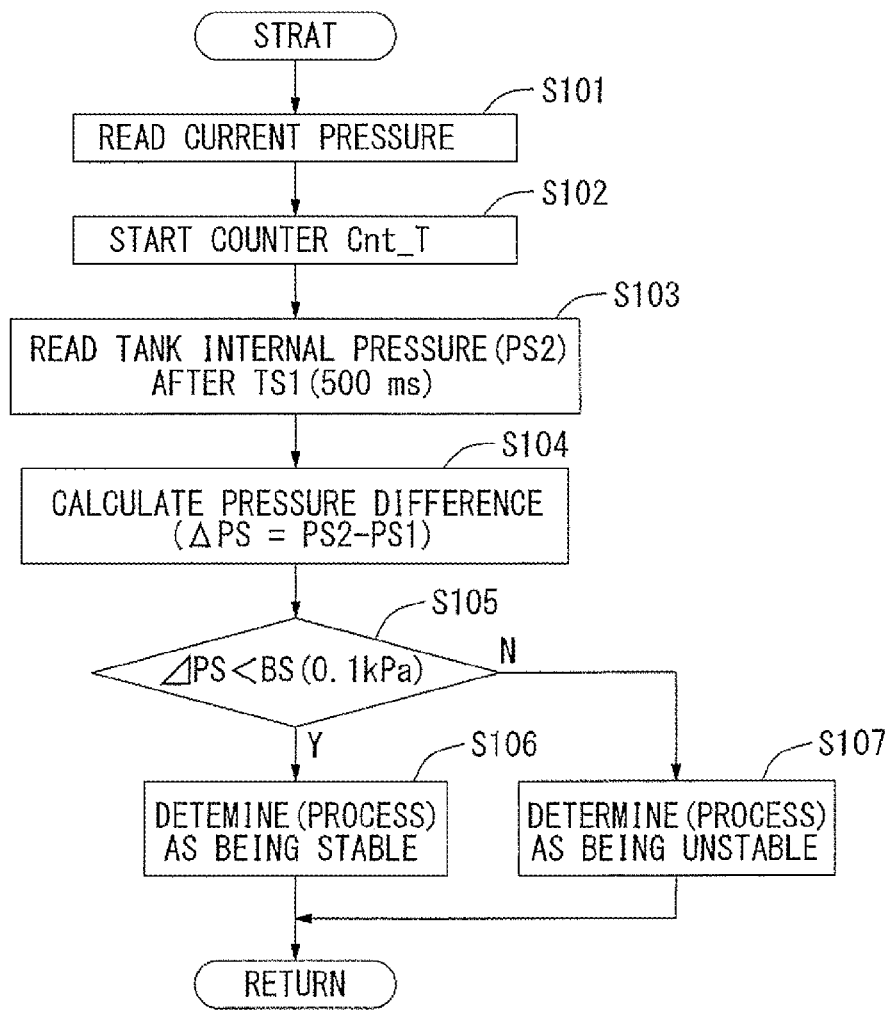
FIG. 13 is a flowchart showing a process for determining whether or not a fuel tank condition is stable or not based on the graph shown in FIG. 12.
Figure 14:
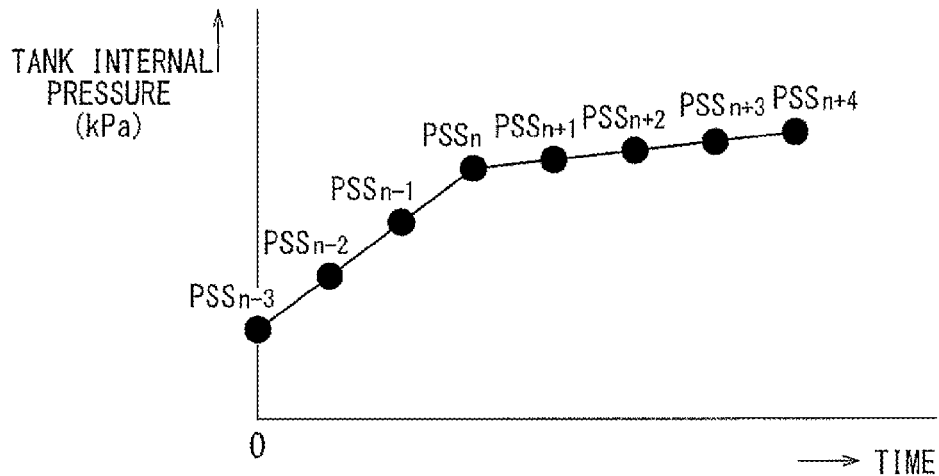
FIG. 14(A) is a graph showing a change in an internal pressure of a fuel tank.
FIG. 14(B) is a graph showing the operations of a stable counter, an unstable counter and a stable determination flag in relation to the change of the internal pressure of the fuel tank shown in FIG. 14(A) during a learning prohibition control performed by a control device of a fuel vapor processing apparatus according to a sixth embodiment.
Figure 14:
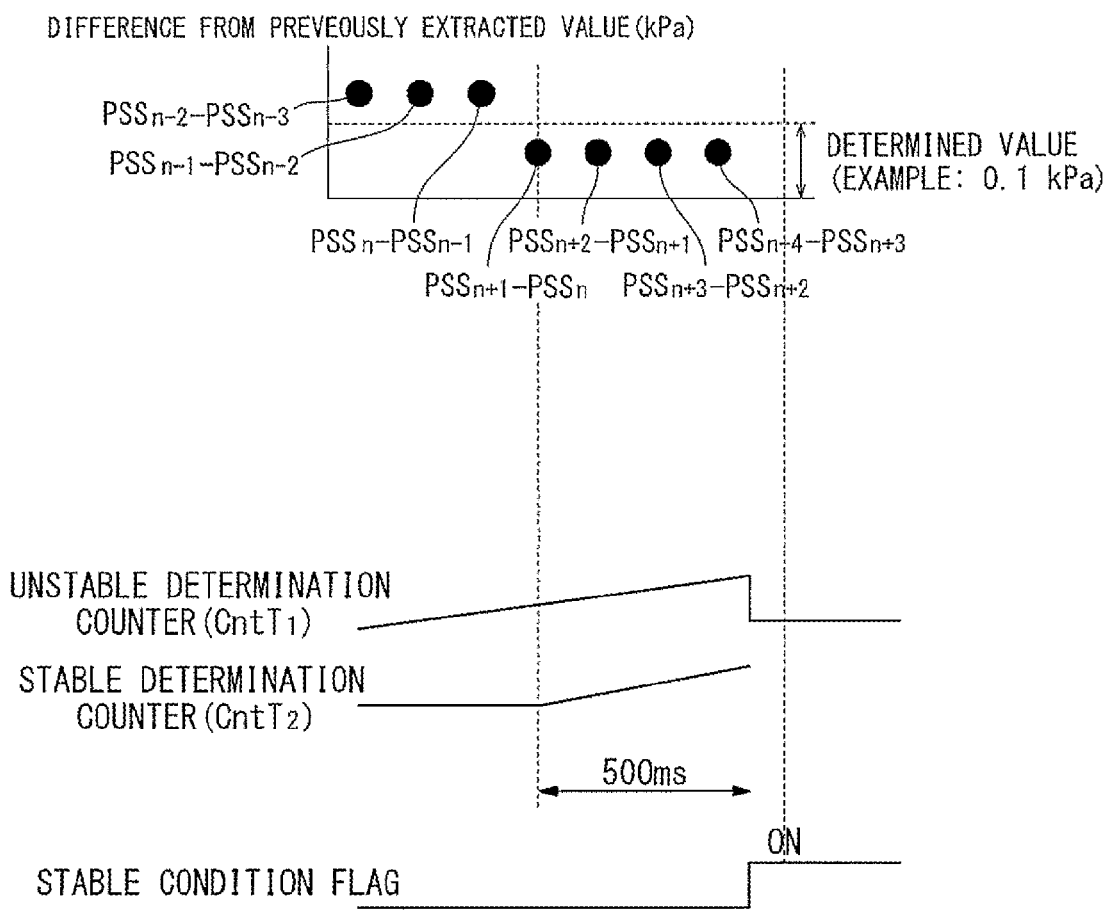

A flowchart shown in FIG. 13 shows a process for determining whether or not the learning control is to be prohibited. The process shown in the flowchart of FIG. 13 may be periodically performed at predetermined time intervals according to a program stored in a memory of the ECU 19.

First, a tank internal pressure PS1 (See FIG. 12) of the fuel tank 15 may be read (detected) in Step S101. After that, a counter Cnt_T may be started in Step S102. Next, in Step 103, a tank internal pressure PS2 may be read (detected) at time TS1 after starting the counter Cn_T. For example, the time TS1 may be 500 milliseconds. The difference between the tank internal pressure PS1 and the tank internal pressure PS2 may be then calculated in step S104 to obtain a pressure difference ΔPS (ΔPS=PS2−PS1). The pressure difference ΔPS may then be compared with a predetermined value BS in step S105. For example, the predetermined value BS may be 0.1 kPa. If the pressure difference ΔPS is smaller than the predetermined value BS ("YES" in step S105), it may be determined that the tank internal pressure is being stable in step S106. If it is determined that the tank internal pressure is being stable, the learning control for learning the valve opening start position may be permitted.

If the pressure difference ΔPS is not smaller than the predetermined value BS ("NO" in step S105), it may be determined that the tank internal pressure is being unstable in step S107. If it is determined that the tank internal pressure is being unstable, the learning control for learning the valve opening start position may be prohibited.

After the learning control for learning the valve opening start position has started based on the determination that the tank internal pressure is being stable in step S106, it may be possible that a degree of fluctuation in the tank internal pressure becomes large and/or the fuel-air ratio of the engine 14 becomes unstable during opening of the closing valve 40. In such a case, the ECU 19 may determine that the learning position was incorrect, and the ECU 19 may rapidly start the learning control again and reset the learning position obtained at the last time.

According to the fuel vapor processing apparatus of this embodiment, the learning step may be performed by moving the valve guide 60 in the valve opening direction from the valve closing limit position (So steps). The valve closing limit position (So steps) may be a position where the valve guide 60 has returned by the predetermined number of steps (Z steps) from the learning value Sx obtained by the learning control performed at the last time. Therefore, similar to the first to fourth embodiments, the valve guide 60 may be moved at a first speed (high speed) until the valve guide 60 reaches the valve closing limit position (So steps). After passing the valve closing limit position (So steps), the valve guide 60 may be moved at a second speed (low speed) for performing the learning step.

Figure 12:
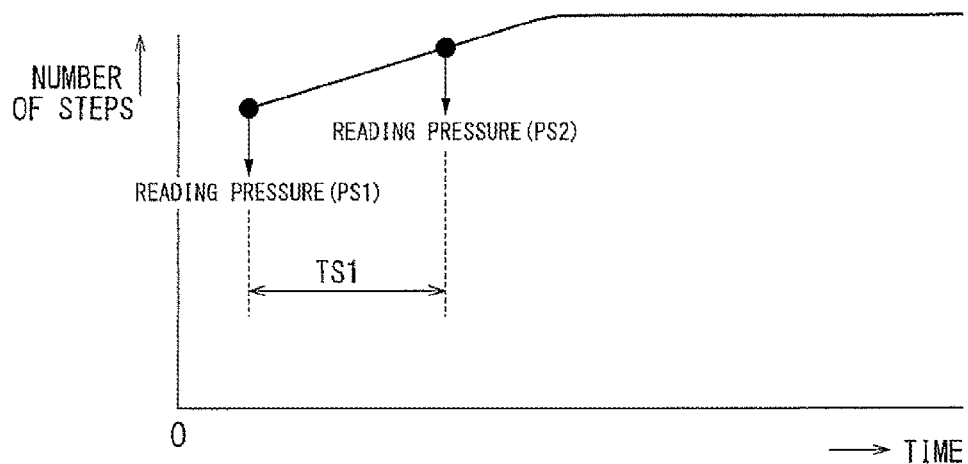
FIG. 12 is a graph illustrating a change in an internal pressure of a fuel tank and times for detecting the internal pressure according to the fifth embodiment.

In addition, according to the learning prohibiting control, the tank internal pressure may be read or detected during the predetermined period TS1 as shown in FIG. 12. If the pressure difference ΔPS (ΔPS=PS2−PS1) during the predetermined period TS1 is equal to or more than the predetermined value BS (e.g., 0.1 kPa), the learning control of the closing valve 40 may be prohibited. Therefore, it may be possible to prohibit the valve opening start position from being incorrectly learned.

Sixth Embodiment

A sixth embodiment will now be described with reference to FIGS. 14(A), 14(B) and 15. This embodiment is a modification of the fifth embodiment and is different from the fifth embodiment only in the learning prohibition control. Therefore, the description will be focused to only the learning prohibition control.

Figure 15:
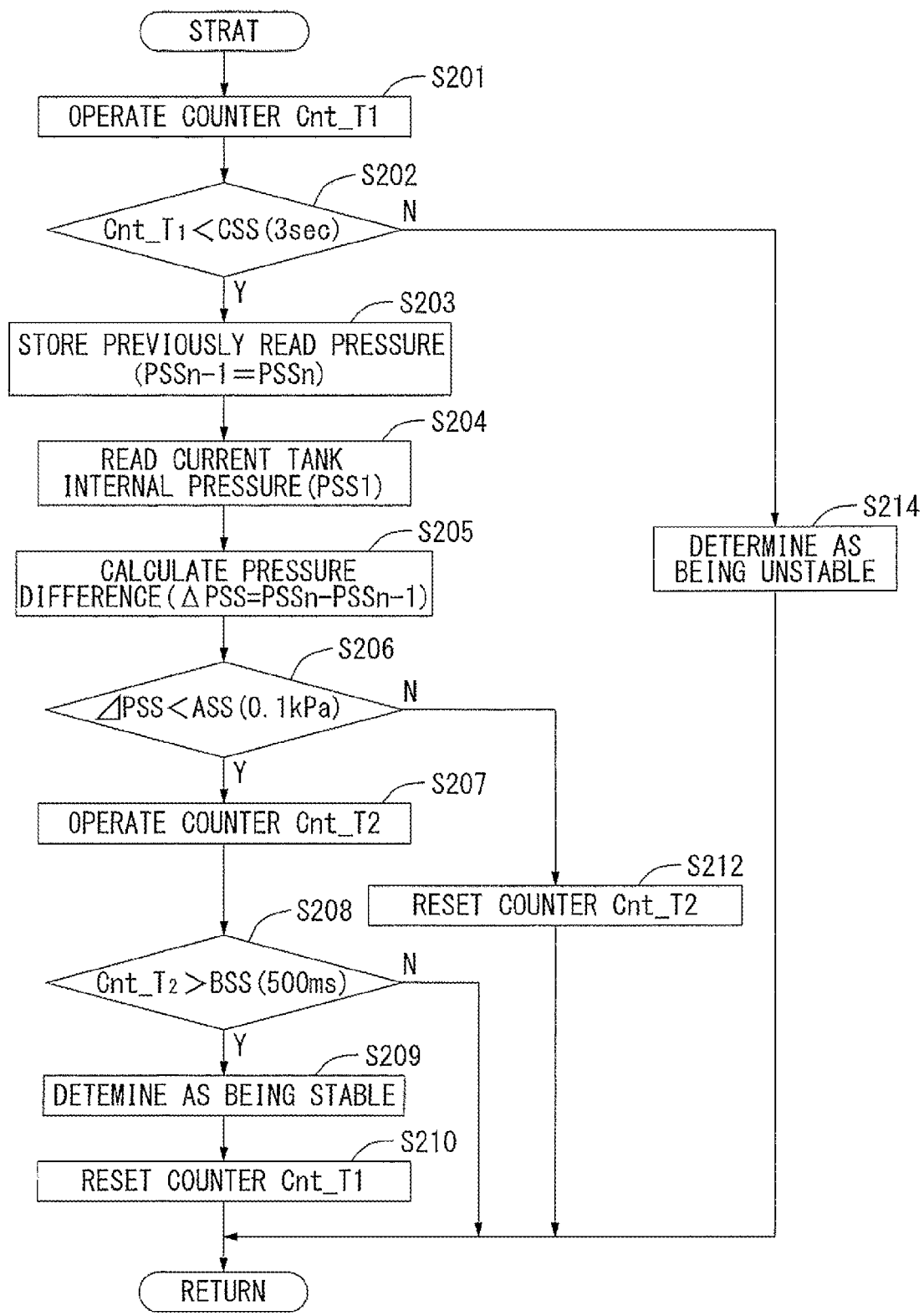
FIG. 15 is a flowchart showing the learning prohibition control.

The process show in FIG. 15 may be periodically performed at predetermined time intervals according to a program stored in the memory of the ECU 19.

In the process shown in FIG. 15, an unstable condition counter Cnt_T1 may be started in Step S201. Step 202 may determine whether or not the time after starting the unstable condition counter Cnt_T1 is less than time CSS that may be three seconds. Immediately after starting the unstable condition counter Cnt_T1, the determination in step S202 may be YES, so that the process proceeds to step S203, step S204 and step S205, where a pressure difference ΔPSS (ΔPSS=PSS$_n$−PSS$_{n-1}$) is calculated. Here, PSS$_n$ is the tank internal pressure detected during the current process, and PSS$_{n-1}$ is the tank internal pressure detected during the last process. If the pressure difference ΔPSS is equal to or larger than a predetermined value ASS such as 0.1 kPa ("NO" in step S206), the process proceeds to step S212, where a stable condition counter Cnt_T2 is reset. Then, the process returns to step S201.

As long as the degree of fluctuation in the tank internal pressure is relatively large (see $PSS_{n-3}$–$PSS_{n-1}$ in FIGS. 14(A) and 14(B)), the process of steps S201 to S212 may be repeatedly performed. If the count value of the unstable condition counter Cnt_T1 becomes equal to or larger than the time CSS (e.g., three seconds) ("NO" in step S202), it may be determined to be an unstable condition (meaning that the tank internal pressure is unstable) in step S214. Then, the learning control of the valve opening start position of the closing valve 40 may be prohibited.

If the pressure difference ΔPSS becomes smaller than the predetermined value ASS (e.g., 0.1 kPa) in step S206 ("YES" in step S206) while the process from step S201 to step 212 is repeatedly performed, the stable condition counter Cnt_T2 may be started in step S207. Thereafter, step S208 may determine whether or not the time after starting the stable condition counter Cnt_T2 is equal to or more than time BSS that may be 500 milliseconds. Immediately after starting the stable condition counter Cnt_T2, the determination in step S208 may be "NO", so that the process returns to step S201. As long as the degree of fluctuation in the tank internal pressure is relatively small (see $PSS_n$–$PSS_{n+4}$ in FIGS. 14(A) and 14(B)), the process of steps S201 to S208 may be repeatedly performed. If the count value of the stable condition counter Cnt_T2 becomes larger than the time BSS (e.g., 500 milliseconds) ("YES" in step S208), a stable condition flag may be raised as shown in the lower portion of FIG. 14(B), and step S209 may determine that the tank condition is stable. After that, the unstable condition counter Cnt_T1 may be reset.

Based on the determination that the tank condition is stable in step S209, the learning control of the valve opening start position of the closing valve 40 may be permitted.

According to the fuel vapor processing apparatus 20 of this embodiment, the tank internal pressure may be periodically read or detected at predetermined time intervals to obtain the pressure difference ΔPSS (ΔPSS=$PSS_n$–$PSS_{n-1}$). If the state where the pressure difference ΔPSS is equal to or larger than the predetermined value ASS (e.g., 0.1 kPa) continues more than the time CSS (e.g., three seconds), it may be determined that the tank condition is unstable. On the other hand, if the state where the pressure difference ΔPSS is less than the predetermined value ASS (e.g., 0.1 kPa) continues more than the time BSS (e.g., 500 milliseconds), it may be determined that the tank condition is stable. In this way, it may be possible to accurately determine the tank condition (i.e., whether or not the tank internal pressure is stable or unstable).

Further, similar to the above embodiments, the stroke distance of the valve guide 60 relative to the valve seat 48 may be changed by utilizing the engagement between the male thread portion 54n and the female thread portion 66w. Therefore, the stroke distance of the valve guide 60 may be accurately controlled by detecting the relative rotational angle between the male thread portion 54n and the female thread portion 66w.

Furthermore, it may be possible to determine whether or not the learned value of the valve opening start position is correct based on the internal pressure of the fuel tank 15 or a signal representing the air-fuel ratio of the engine 14 during opening of the closing valve 40. If it is determined that the learned value is incorrect, the learned valve may be reset. In this way, it may be possible to inhibit the closing valve 14 from being operated based on the incorrect learned value. As a result, the control of the internal pressure of the fuel tank 15 and the air-fuel ratio control of the engine 14 can be performed in a stable manner.

The above fifth and sixth embodiments will be modified in various ways. For example, in these embodiments, determination of whether or not the condition of the fuel tank 15 is stable or unstable is made based on the change in the internal pressure of the fuel tank 15. However, it may be possible to determine that the fuel tank condition is unstable if the fluctuation of the liquid level within the fuel tank 15 is larger than that during traveling of the vehicle. With this determination, the learning control of the valve opening start position of the closing valve 40 may be prohibited.

The fluctuation of the liquid level within the fuel tank 15 may become larger than that during normal traveling of the vehicle, for example, due to sudden acceleration or reduction of the vehicle speed (which may be determined based on the degree of opening of the throttle valve 17, a signal from an acceleration sensor or a stepping force of a vehicle brake, etc.), a large turning angle of the vehicle (which may be determined based on a steering angle), rough road traveling (which may be determined based on the internal pressure of a shock absorber), descending or ascending road traveling (which may be determined based on inclination of the vehicle), or a gust of wind (which may be determined based on a highlighted indication in a navigation display).

If the fluctuation of the liquid level within the fuel tank 15 becomes larger than that during normal traveling of the vehicle, it is likely that fuel vapor is produced within the fuel tank 15 to cause an increase in the internal pressure of the fuel tank 15. In this way, the learning control of the valve opening start position may be prohibited to prohibit incorrect learning of the valve opening start position in the case that the fluctuation of the liquid level within the fuel tank 15 becomes larger than that during normal traveling of the vehicle. When the vehicle is stationary, it may be determined that the fuel tank condition is being stable to permit the learning control. In the case of a hybrid electric vehicle, it may be determined that the fuel tank condition is being stable during traveling of the vehicle using an electric motor as a drive source.

Further, in the fifth and sixth embodiments, the learning control of the valve opening start position is performed at each occasion that the closing valve 40 is opened by a predetermined number of times. However, the learning control may be performed at each time the closing valve 40 is opened, and the learned value may be reset each time before the closing valve 40 is opened at the next time. In this way, the learning value may be updated at each time the closing valve 40 is opened, so that it may be possible to use the closing valve 40 always in a proper condition.

Furthermore, although the stepping motor 50 is used for the closing valve 40 in the above embodiments, it may be possible to use a DC motor or the like instead of the stepping motor 50.

Controller

Figure 16:
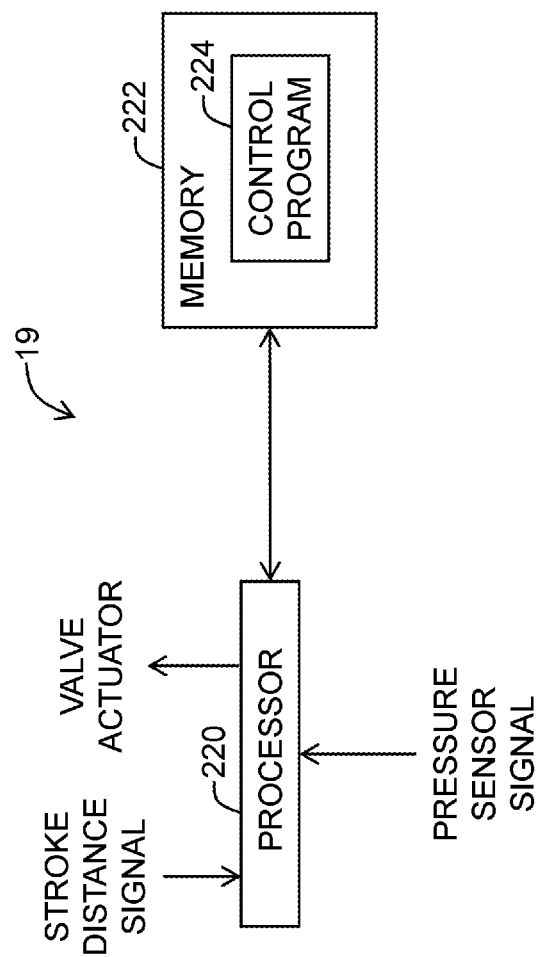
FIG. 16 is a block diagram of an example of a controller to perform a learning control.

FIG. 16 shows an example of the ECU 19. In this example, the ECU 19 includes a processor 220 coupled to memory 222. Memory 222 includes a control program 224 which is executable by the processor 220. When the control program 224 is executed, the processor 220 performs any or all of the various functions described herein as attributed to the EC 19. A stroke distance signal may be provided to the processor 220. A stroke sensor may be used to detect the stroke position of the movable valve (e.g., valve guide 60) so that a stroke position signal from the stroke sensor can be used as a signal representing the stroke distance (i.e., the stroke distance signal). Thus, the stroke distance signal may directly specify the stroke distance directly or may be indirectly indicate the stroke distance by way of, for example, a stroke position.

For example, the control program 224 may cause the processor 220 to perform a perform a learning control, in which an opening start position of a closing valve (e.g., closing valve 40) is learned based on a signal representing a stroke distance of a movable valve member (e.g. valve guide 60) of a closing valve at the time when an internal pressure of a fuel tank is reduced by a predetermined pressure value from a reference pressure value while a moving distance of the movable valve member is changed. The moving distance may be changed such that the processor 220 causes the movable valve member to move from the reference position to a learning start position at a first speed in a valve opening direction, and causes the movable valve member to move further from the learning start position in the valve opening direction at a second speed. The second speed may be lower than the first speed.

By way of another example, the control program 224 may cause the processor 220 to perform a perform a learning control, in which an opening start position of a closing valve (e.g., closing valve 40) is learned based on a signal representing a stroke distance of a movable valve member (e.g. valve guide 60) of a closing valve at the time when an internal pressure of a fuel tank is reduced by a predetermined pressure value from a reference pressure value while a moving distance of the movable valve member is changed. The moving distance may be changed such that the processor 220 causes the movable valve member to move from a learning start position in a valve opening direction. The learning start position may be a position where the stroke distance of the movable valve member is smaller than a reference learning value by a predetermined control value.

What is claimed is:

1. A fuel vapor processing apparatus comprising:
    a canister configured to be capable of adsorbing fuel vapor produced in a fuel tank;
    a closing valve provided in a vapor passage connecting the canister and the fuel tank, the closing valve comprising a movable valve member and an actuator coupled to the movable valve member;
    wherein the closing valve is closed when a stroke distance of the movable valve member with respect to a reference position is between zero and a valve open start position, and the closing valve is opened when the stroke distance of the movable member exceeds the valve open start position; and
    a control device coupled to the actuator and configured to perform a learning control, in which the valve opening start position is learned based on the stroke distance of the movable valve member, which is given at the time when an internal pressure of the fuel tank is reduced by a predetermined pressure value from a reference pressure value while the moving distance of the movable valve member is changed such that:
        (a) the movable valve member moves from the reference position to a learning start position at a first speed in a valve opening direction; and
        (b) the movable valve member moves further from the learning start position in the valve opening direction at a second speed;
        wherein the second speed is lower than the first speed.

2. The fuel vapor processing apparatus according to claim 1, wherein:
    the closing valve further includes a valve seat, so that the movable valve member is movable relative to the valve seat in an axial direction.

3. The fuel vapor processing apparatus according to claim 1, wherein the learning start position is a valve closing limit position determined according to a design of the closing valve.

4. The fuel vapor processing apparatus according to claim 1, wherein the leaning start position is away from a pressure reducing position by a distance in a valve closing direction opposite to the valve opening direction, the pressure reducing position being a position where the internal pressure of the fuel tank is reduced by the predetermined pressure value during the movement of the movable valve member at the first speed.

5. The fuel vapor processing apparatus according to claim 1, wherein:
    the stroke distance of the movable valve member is changed at the second speed by repeating a learning step, the learning step including a first step part in which the stroke distance is shifted in the valve opening direction by a first distance, and a second step part in which the stroke distance is shifted in a valve closing direction opposite to the valve opening direction by a second distance smaller than the first distance.

6. The fuel vapor processing apparatus according to claim 5, wherein:
    the internal pressure of the fuel tank is detected during the second step part of the learning step; and
    the control device is configured to determine the valve opening start position based on a stroke distance value that is given when the tank internal pressure is reduced by the predetermined pressure value during the second step part of any of the repeated learning steps.

7. The fuel vapor processing apparatus according to claim 5, wherein:
    the internal pressure of the fuel tank is detected during the second step part of the learning step;
    the control device is configured to determine the valve opening start position based on a stroke distance value that is given during the second step part of the leaning step performed prior to any of the repeated learning steps, where the tank internal pressure is reduced by the predetermined pressure value during the second step part.

8. The fuel vapor processing apparatus according to claim 1, wherein the canister is connected to a vehicle engine via a purge passage, and the control device is configured to perform the learning control at each time the vehicle engine is started.

9. A fuel vapor processing apparatus comprising:
    a canister configured to be capable of adsorbing fuel vapor produced in a fuel tank;
    a closing valve provided in a vapor passage connecting the canister and the fuel tank, the closing valve comprising a movable valve member and an actuator coupled to the movable valve member;
    wherein the closing valve is closed when a stroke distance of the movable valve member with respect to a reference position is between zero and a valve open start position, and the closing valve is opened when the stroke distance of the movable member exceeds the valve open start position; and
    a control device coupled to the actuator and configured to perform a learning control, in which the valve opening start position is learned based on the stroke distance of the movable valve member, which is given at the time when an internal pressure of the fuel tank is reduced by a predetermined pressure value from a reference pressure value while the moving distance of the movable valve member is changed such that:
        the movable valve member moves from a learning start position in the valve opening direction;
        wherein the learning start position is a position where the stroke distance of the movable valve member is smaller than a reference learning value by a predetermined control value.

10. The fuel vapor processing apparatus according to claim 9, wherein the control device is configured to repeatedly perform the learning control, and the reference learning value is that obtained by the learning control previously performed.

11. The fuel vapor processing apparatus according to claim 9, wherein the control device is further configured to perform a learning prohibition control in which the learning control for learning the valve opening start position is prohibited if a fuel tank condition is unstable.

12. The fuel vapor processing apparatus according to claim 11, wherein the fuel tank condition is determined to be unstable if a degree of fluctuation of a fuel liquid level within the fuel tank is larger than a predetermined fluctuation value.

13. The fuel vapor processing apparatus according to claim 11, wherein the fuel tank condition is determined to be unstable if a change of the internal pressure of the fuel tank during a predetermined period of time is larger than a predetermined reference value.

14. The fuel vapor processing apparatus according to claim 13, wherein the learning control of the valve opening start position is permitted if the change of the internal pressure of the fuel tank during the predetermined period of time becomes equal to or smaller than the predetermined reference value after the fuel tank condition has been determined to be unstable.

15. The fuel vapor processing apparatus according to claim 11, wherein:
   the internal pressure of the fuel tank is detected at predetermined time intervals to obtain a pressure difference between a detected pressure and a predetermined reference pressure,
   if the pressure difference is larger than a predetermined limit value throughout a first predetermined period of time, the fuel tank condition is determined to be unstable, and
   if the pressure difference is not larger than the predetermined limit value throughout a second predetermined period of time, the fuel tank condition is determined to be stable.

16. The fuel vapor processing apparatus according to claim 11, wherein the canister is connected to a vehicle engine via a purge passage, and the fuel tank condition is determined to be stable if the vehicle engine is stopped.

17. The fuel vapor processing apparatus according to claim 11, wherein:
   the control device is further configured to determine whether or not a learning value of the valve opening start position is correct, and
   if it is determined that the learning value is incorrect, the control device resets the learning value and the learning control is performed by moving the movable valve member from the reference position.

18. The fuel vapor processing apparatus according to claim 17, wherein the control device is configured to determine whether or not the learning value is correct based on the internal pressure of the fuel tank during opening of the closing valve.

19. The fuel vapor processing apparatus according to claim 18, wherein:
   the canister is connected to a vehicle engine via a purge passage, and
   the control device is configured to determine whether or not the learning value is correct based on an air-fuel ratio of the vehicle engine during opening of the closing valve.

20. The fuel vapor processing apparatus according to claim 11, wherein:
   the learning control is performed at each occasion that the closing valve is opened by a predetermined number of times, and
   at each time the learning control is performed, the leaned value obtained by the previous learning control is reset, so that the movable valve member moves from the reference position for performing the learning control.

21. The fuel vapor processing apparatus according to claim 11, wherein:
   the closing valve further includes a valve seat, so that the movable valve member can move relative to the valve seat in an axial direction;
   the actuator is a rotary drive device; and
   a thread mechanism is provided between the movable valve member and the rotary drive device, so that the movable valve member moves relative to the valve seat in the axial direction as the rotary drive device rotates.

* * * * *